United States Patent
Che

(10) Patent No.: US 7,420,759 B2
(45) Date of Patent: Sep. 2, 2008

(54) APPARATUS AND METHOD FOR INTERNAL CALIBRATION OF NORMALIZED PLAYBACK TRANSFER CURVE IN A HARD DISK DRIVE

(75) Inventor: Xiaodong Che, Saratoga, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 172 days.

(21) Appl. No.: 11/591,745

(22) Filed: Oct. 31, 2006

(65) Prior Publication Data

US 2008/0100943 A1    May 1, 2008

(51) Int. Cl.
*G11B 27/36*    (2006.01)

(52) U.S. Cl. ...................................... 360/31

(58) Field of Classification Search ............ 360/31, 360/53, 69, 71, 78.01; 369/59.12, 47.44, 369/59.11, 44.29, 124.05, 30.1, 47.53, 47.51; 340/318; 714/798
See application file for complete search history.

(56) References Cited

U.S. PATENT DOCUMENTS

| | | | | | |
|---|---|---|---|---|---|
| 2,528,682 | A | * | 11/1950 | Blaney ........................ | 360/31 |
| 2,737,646 | A | * | 3/1956 | Muffly ....................... | 340/318 |
| 3,359,783 | A | * | 12/1967 | Scheiman et al. ............... | 73/7 |
| 5,570,335 | A | * | 10/1996 | Ogata et al. ............ | 369/124.05 |
| 5,848,036 | A | * | 12/1998 | Ishibashi et al. ......... | 369/44.29 |
| 5,859,742 | A | * | 1/1999 | Takaishi ................... | 360/78.01 |
| 6,259,661 | B1 | * | 7/2001 | Suekuni .................... | 369/47.44 |
| 6,510,116 | B1 | * | 1/2003 | Miyagawa et al. ....... | 369/59.12 |
| 6,624,911 | B1 | * | 9/2003 | Cooper et al. ................ | 358/1.9 |
| 7,088,663 | B2 | * | 8/2006 | Sasaki et al. ............. | 369/59.11 |
| 7,134,068 | B2 | * | 11/2006 | Silvus et al. ................ | 714/798 |
| 2004/0052177 | A1 | * | 3/2004 | Maegawa ................ | 369/47.51 |
| 2004/0055444 | A1 | * | 3/2004 | Ishii et al. ...................... | 84/604 |
| 2005/0063268 | A1 | * | 3/2005 | Ninomiya ................ | 369/47.53 |
| 2005/0068856 | A1 | * | 3/2005 | Hsu et al. .................. | 369/30.1 |
| 2007/0195671 | A2 | * | 8/2007 | Miyamoto et al. ....... | 369/59.11 |

* cited by examiner

*Primary Examiner*—Fred Tzeng
(74) *Attorney, Agent, or Firm*—Earle Jennings; GSS Law Group

(57) ABSTRACT

Method calibrates an assembled hard disk drive for read head accessing rotating disk surface, by estimating non-linearity of that playback device based on two data patterns, which have a short transition-pair waveform and a long transition-pair waveform. By linearly constructing a simulated long transition-pair waveform from the short transition-pair waveform and aligning it with the long transition-pair waveform, non-linear distortion is estimated, creating the transfer curve as product of this process. The transfer curve is used to compensate the read data of a track to create the adjusted read data, which is used to decode the track being read. The adjusted read data is the product of this process. The hard disk drive including the transfer table. Second method using transfer table to create adjusted read data for track, the processor, embedded circuit and hard disk drive implementing this method. Manufacturing embedded circuit as product.

44 Claims, 17 Drawing Sheets

Fig. 1C
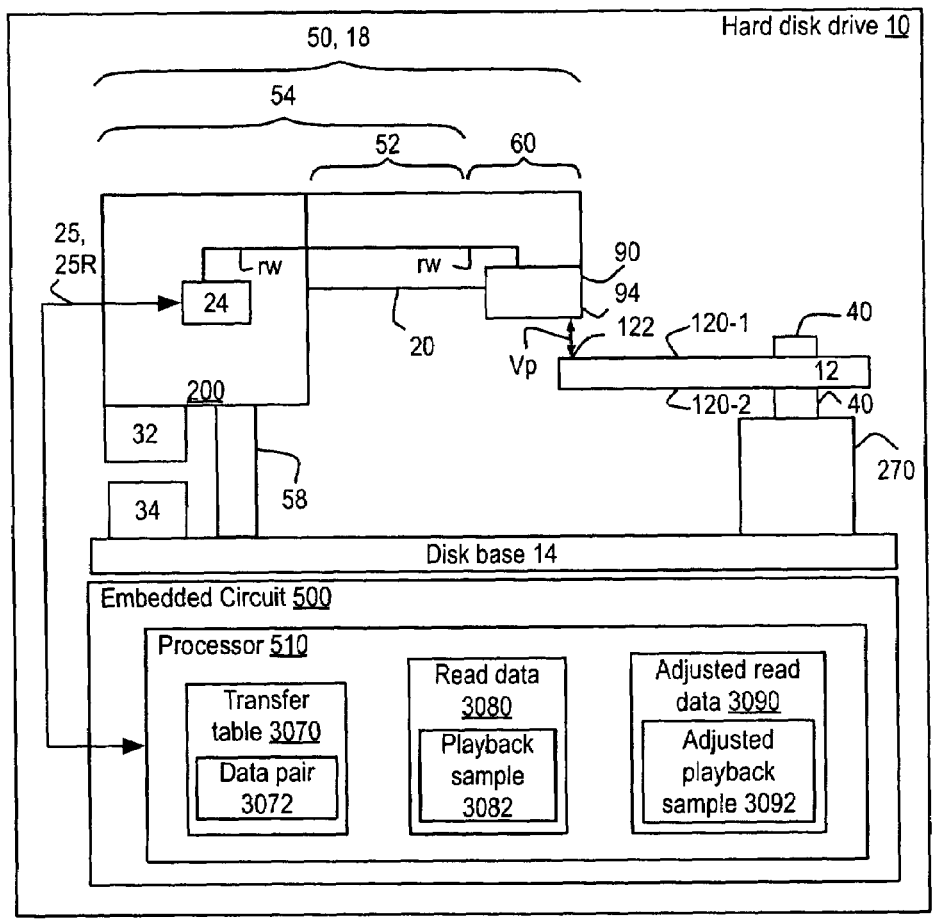
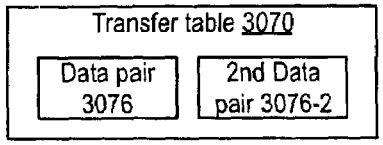
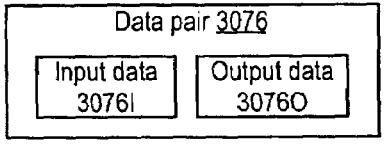
Fig. 1D      Fig. 1E
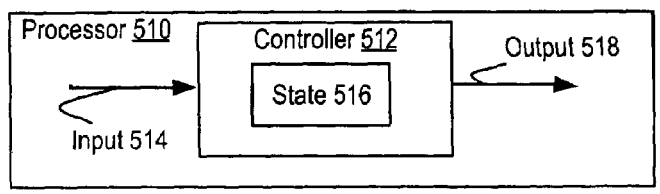
Fig. 1F

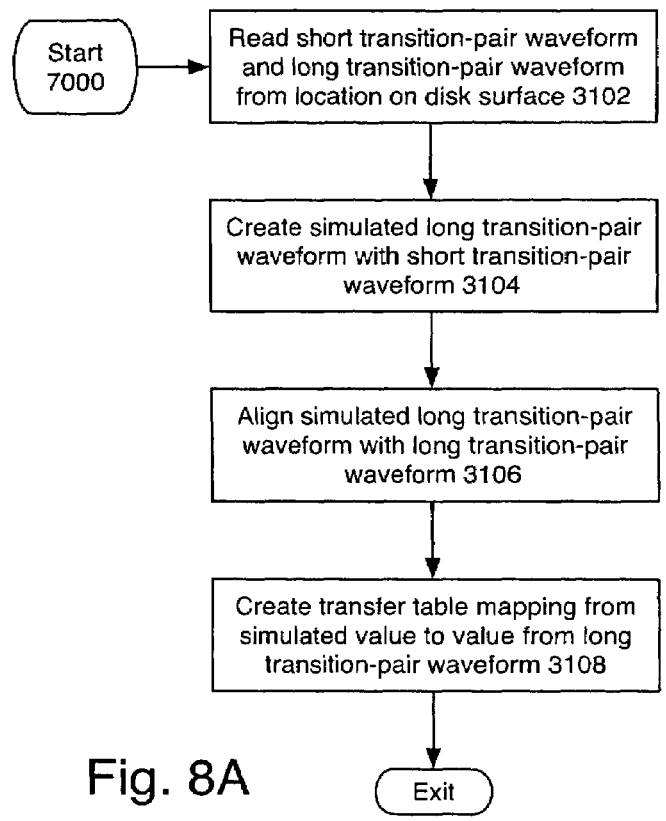
Fig. 8A
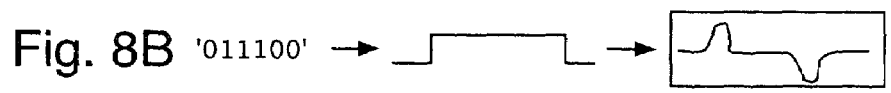
Fig. 8B '011100'
Fig. 8C '010010'

APPARATUS AND METHOD FOR INTERNAL CALIBRATION OF NORMALIZED PLAYBACK TRANSFER CURVE IN A HARD DISK DRIVE

TECHNICAL FIELD

This invention relates to hard disk drives, in particular, to apparatus and methods for calibrating an assembled hard disk drive to compensate the playback nonlinear distorted transfer curve of a playback device based upon the reading of a written track or location within a track on a rotating disk surface inside the hard disk drive.

BACKGROUND OF THE INVENTION

Contemporary hard disk drives include an actuator assembly pivoting through an actuator pivot to position one or more read-write heads, embedded in sliders, each over a rotating disk surface. The data stored on the rotating disk surface is typically arranged in concentric tracks. To access the data of a track, a servo controller first positions the read-write head by electrically stimulating the voice coil motor, which couples through the voice coil and an actuator arm to move a head gimbal assembly in lateral positioning the slider close to the track. Once the read-write head is close to the track, the servo controller typically enters an operational mode known herein as track following. It is during track following mode that the read-write head is used to access data written on the track.

Micro-actuators provide a second actuation stage for lateral positioning the read-write head during track following mode. They often use an electrostatic effect and/or a piezoelectric effect to rapidly make fine position changes. They have doubled the bandwidth of servo controllers and are believed essential for high capacity hard disk drives from hereon.

The read-write heads used in contemporary hard disk drives differ from standard idealized models in several ways, most notably in having nonlinearities, which become evident when what is written is compared to what is read on a track in the hard disk drive. Compensating for these nonlinearities improves the channel detection resulting in higher performance and better reliability margin of the hard disk drive, and is often implemented today. The nonlinearity also causes head to media clearance measurement error. This measurement requires very good linear response from the playback device. For hard disk drives using vertical micro-actuation through thermal mechanical or other effect to control the head to media clearance, this nonlinearity tends to cause errors in the head to media clearance and compromise reliability.

The quantitative measure of a read head as a playback device is the transfer curve which plots the relation of the input (in this case, field applied to the reader device) and the output (in this case, the signal from the reader device). A linear playback device yields a transfer curve as a straight line, and a nonlinear playback device yields a transfer curve with high order polynomial components. Currently, the estimation of these nonlinear effects, measuring the transfer curve, is done before the hard disk drive is assembled, often at the level of the slider, the head gimbal assembly, or the head stack assembly. There are several problems and/or disadvantages with this approach. First, special equipment in the form of a device known as a "quasi-static tester" is required to make these estimates. This inevitably increases manufacturing expense, by requiring time on this test stand as well as the potential for tooling and setup costs. Second, the tests are currently performed using a uniform electromagnetic field, which is a far cry from the rapidly varying electromagnetic field induced by flying the read head within a few nanometers of a track on a rotating disk surface. Third, the use of the uniform field also limits the understanding of the distortion caused by the shields of the read head and the soft pole material of the write heads. What is needed is a method allowing the actual non-linearity of the assembled hard disk drive to be calibrated.

SUMMARY OF THE INVENTION

The invention's first method calibrates an assembled hard disk drive for a read head accessing a rotating disk surface, by estimating non-linearity of that playback device based on two data patterns, known herein as the long transition-pair pattern and the short transition-pair pattern, which are written as a form of the long transition-pair waveform and the short transition-pair waveform onto at least one track on the rotating disk surface. The first method creates a transfer table, which the invention's second method uses to convert the playback sample in the read data of a track into adjusted read data, which is compensated for nonlinear playback distortion using the transfer table.

As used herein the short transition-pair waveform, the simulated long transition-pair waveform and the long transition-pair waveform are each functions of one real variable, which will be referred to as time in terms of writing and reading these waveforms to and from at least a portion of a track on the rotating disk surface. As recorded on the disk surface, they both can be represented as a function of one real variable, the angular placement within the track. The following definitions are provided to clarify these functions and to provide the background necessary to understand their definition:

A short transition-pair waveform 3050 of bit cell time length T is an approximate anti-symmetric real value function $F_{3050}$ having a support interval of length 2T.

A simulated long transition-pair waveform 3060 is the result of time offset adding N instances of the short transition-pair waveform $$F_{3060}(t) = \sum_{k=0}^{N-1} F_{3050}(t+kT).$$

This is essentially the long transition-pair waveform pattern 3020 written to the track 122 on the rotating disk surface 120-1.

The process of writing and then playing back the long transition-pair waveform pattern can be summarized as a playback process, so that the read data 3080 of the written long transition-pair waveform pattern 3020 is the long transition-pair waveform 3040, which is a nonlinear distortion of the simulated long transition-pair waveform 3060.

Regarding the first method, these patterns may be written successively across the entire track, written successively into exactly one sector, preferably written into different sectors of the same track, or possibly written into neighboring tracks. When written into sectors, these patterns may preferably be the data payload of the sector.

The first method will be discussed in terms a processor as shown in FIGS. 1A and 1B, and further in terms of the second program system as shown in FIGS. 1B, 8A, and 8F residing in the second memory second accessibly coupled to the embedded computer in the embedded circuit directing the hard disk drive. This method includes the following steps:

The processor reads the short transition-pair waveform and the long transition-pair waveform from their location on the rotating disk surface as shown in FIGS. 1A, 1B, and 3A. As stated above, the location may include a track, a sector of the track, multiple sectors and/or multiple tracks.

The processor creates a simulated long transition-pair waveform with the short transition-pair waveform.

The processor aligns the simulated long transition-pair with the long transition-pair waveform. The inventors have found through their experiments that the long transition-pair waveform will tend to exhibit the non-linear effects far stronger than the short transition-pair waveform, so that by creating a simulated long transition-pair waveform with the short transition-pair waveform and comparing with the long transition-pair waveform, they can achieve a map of this non-linearity.

The processor creates the transfer table mapping from the simulated value (presumably linear input) to the value from the long transition-pair waveform (presumably having nonlinear distortion) as shown in FIG. 3B. In certain embodiments, the transfer table may be represented by a non-linear compensation function, which may be represented as a set of nonlinear correction factors.

The reading of the short and the long transition-pair waveform may preferably use a preamplifier to provide these waveforms. The preamplifier's gain may be a constant for the range of the input signals from the reader device, may preferably be pre-determined to offer the most linear performance. The read head may use a spin valve or a tunneling valve to read the data on the rotating disk surface.

The first method has several advantages: calibration is done in the assembled hard disk drive, which minimizes the requirements on the quasi-static tester, assures a more accurate calibration which is directly applicable to the assembled hardware in its normal operating environment, and supports time varying test patterns which more closely approximate the actual normal operating conditions of the hard disk drive. It is also more accurate since it is based on the field from the real media with the data patterns consistent with the coding schemes that will actually be employed in the hard disk drive. These coding schemes typically implement either a Non-Recurring Zero (NRZ) coding scheme as shown in FIG. 8B, or a Non-Recurring Zero Inverse (NRZI) coding scheme as shown in FIG. 8C.

The first method may preferably be performed on several tracks on the rotating disk surface, which will be referred to as tested tracks. These tested tracks may preferably be distributed across the rotating disk surface from the Inside Diameter to the Outside Diameter. It may preferably be performed on each of the rotating disk surfaces in the hard disk drive used for data access.

The result of the transfer table and/or nonlinear correction factors can be saved in a non-volatile memory component of embedded circuit or on a dedicated area of a rotating disk surface. A memory component is volatile if it loses its memory contents when there is no power, and non-volatile otherwise. The saved information can be recovered each time when the hard disk drive is powered up.

The invention includes manufacturing the hard disk drive and that hard disk drive as a product of the invention's manufacturing process.

The invention's second method includes a hard disk drive using the transfer table to compensate for non-linear playback distortion in the read data of a track to create the adjusted read data, which will be discussed in terms of FIGS. 1B, 1C, and 9D to 9F. The adjusted read data is a product of this second method.

By way of example, FIG. 1C shows a hard disk drive and an embedded circuit including a processor implementing the second method. As used herein, the processor includes at least one instance of at least one controller, wherein each controller includes at least one input, maintains and alters at least one state, and generates at least one output based upon at least one of the inputs and/or at least one of the states as shown in FIG. 1F.

The transfer table preferably includes at least two data pairs as shown in FIG. 1D. Each data pair may include an input data and an output data as shown in FIG. 1E.

In certain embodiments of the invention, the transfer table may preferably include one data pair for each possible value of the playback sample. Further, the transfer table may include an array of the input data arranged at successive addresses corresponding to the output data. The output data of the data pair may be used as the address of the input data in the array as shown in FIG. 1G. The processor may preferably receive from the channel interface the playback sample, use the playback sample to provide the address of the corresponding input data, which is read to create the adjusted playback sample as shown in FIG. 1G. In certain embodiments of the invention's hard disk drive, the processor may preferably act as the embedded computer of FIG. 1B.

BRIEF DESCRIPTION OF THE DRAWINGS

FIG. 1C shows an embodiment of the hard disk drive directed by the processor implementing the invention's second method using the transfer table;

FIGS. 1D and 1E show some details of the transfer table of FIGS. 1B and 1C;

FIG. 1F shows some details of the processor included in the embedded circuit of FIGS. 1A to 1C;

FIG. 8A shows the second program system of FIG. 1 outlining some aspects of the invention's method;

FIG. 8B shows an example of a Non-Recurring Zero (NRZ) coding scheme and the resulting waveform;

FIG. 8C shows an example of a Non-Recurring Zero Inverse (NRZI) coding scheme leading from a different pattern on the left to the same resulting waveform on the right as the NRZ example in FIG. 8B;

DETAILED DESCRIPTION

This invention relates to hard disk drives, in particular, to apparatus and methods for calibrating an assembled hard disk drive to compensate the playback nonlinear distorted transfer curve of a playback device based upon the reading of a written track or location within a track on a rotating disk surface inside the hard disk drive.

Figure 1A:
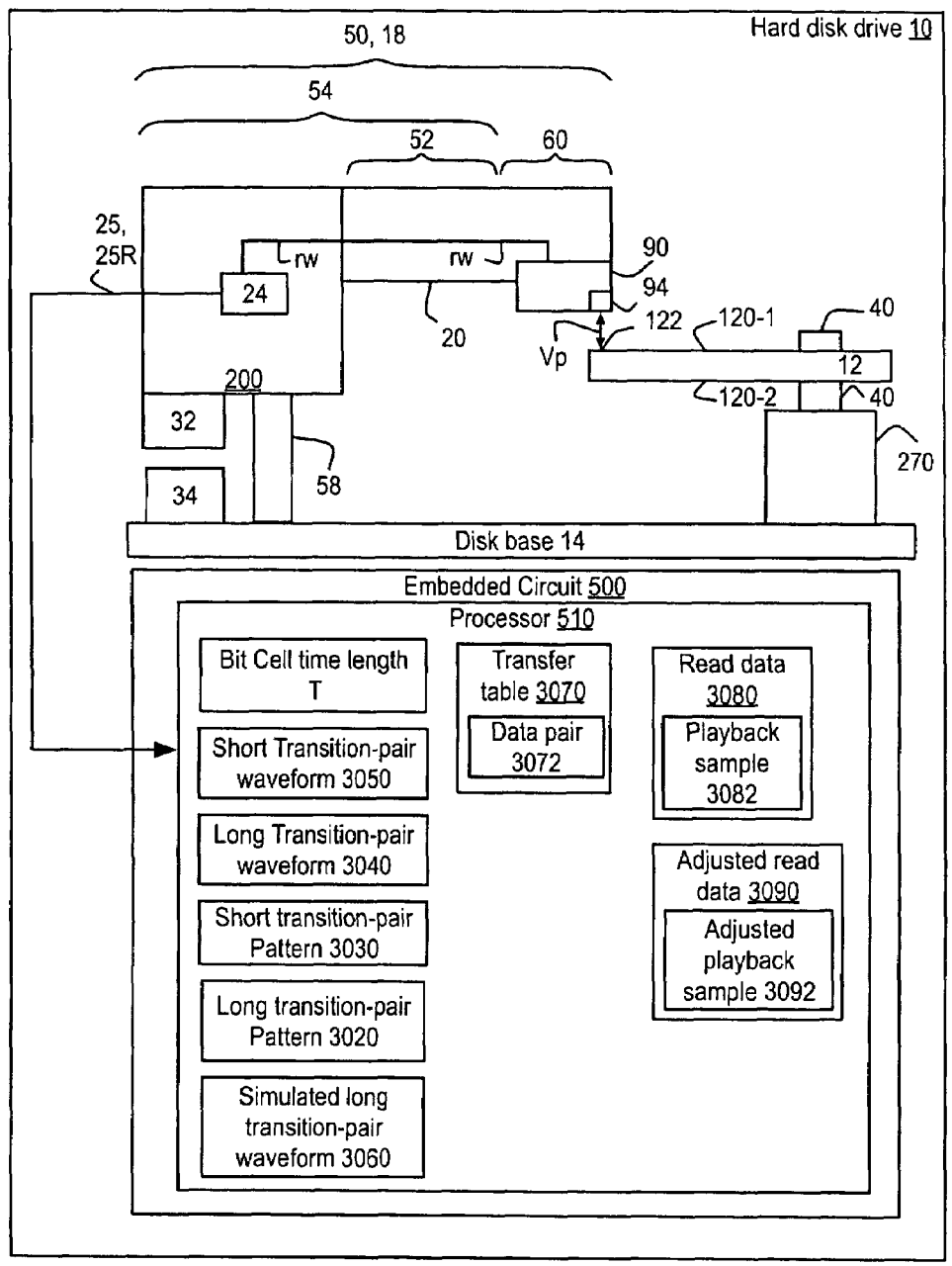
FIG. 1A shows an example embodiment of a processor, included in an assembled hard disk drive, to implement creating transfer table by using a bit cell time length and the observed playback of at least part of at least one track on a rotating disk surface as the short transition pair waveform and the long transition pair waveform, and to implement the second method of using the transfer table.
Figure 1B:
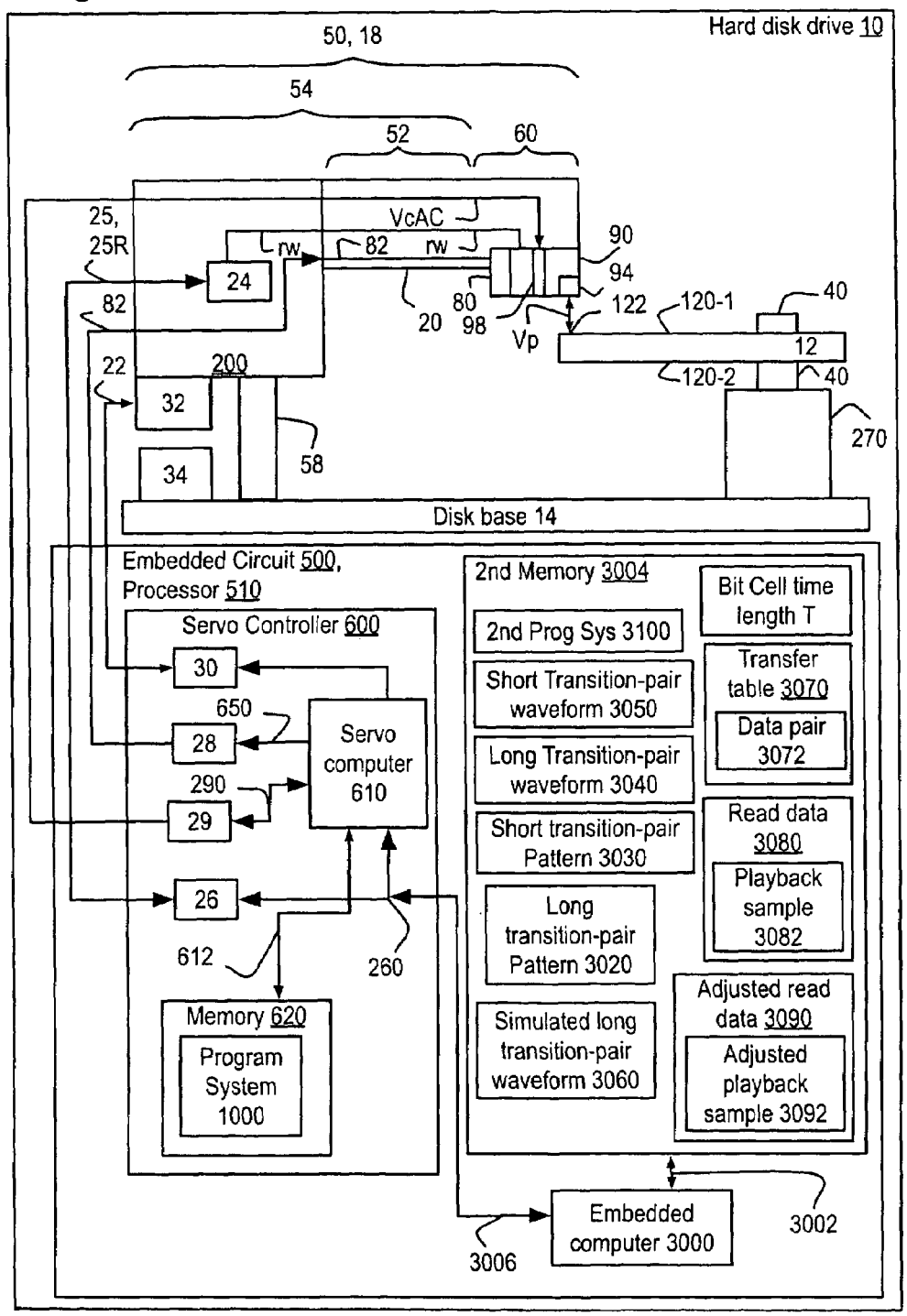
FIG. 1B shows an example of the embodiment of FIG. 1A in greater detail.
Figure 8D:
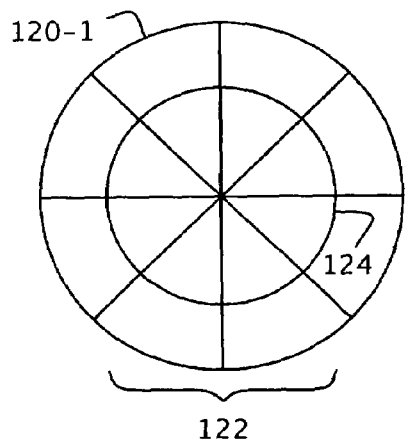
FIGS. 8D and 8E show some details of the typical organization of a track as used herein.
Figure 8E:
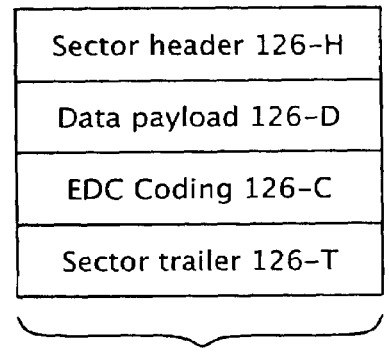

The invention's first method calibrates an assembled hard disk drive 10 for a read head 94-R accessing a rotating disk surface 120-1, by estimating non-linearity of that playback device based on two data patterns, known herein as the long transition-pair pattern 3020 and the short transition-pair pattern 3030, which are written and played back as a form of the long transition-pair waveform 3040 and the short transition-pair waveform 3050 onto at least one track 122 on the rotating disk surface as shown in FIGS. 1A and 1B. These patterns may be written successively across the entire track, written successively into exactly one sector 124 as shown in FIG. 8D, preferably written into different sectors of the same track, or possibly written into neighboring tracks. When written into sectors, these patterns may preferably be the data payload 126-D of the sector as shown in FIG. 8E.

An embodiment of the assembled hard disk drive 10 is shown in FIGS. 1A and 1D including an embedded circuit 500, which further preferably includes a processor 510 implementing both the first method of creating the transfer table 3070, and the second method using the transfer table. FIG. 1C shows an embodiment of the hard disk drive where the processor implements only the second method of using the transfer table, which may be preferred in certain embodiments.

Before discussing in detail the methods and embodiments of the invention, working definitions of the short transition-pair waveform 3050, the simulated long transition-pair waveform 3060, and the long transition-pair waveform 3040 will be developed:

As used herein the short transition-pair waveform 3050, the simulated long transition-pair waveform 3060, and the long transition-pair waveform 3040 are each functions of one real variable, which will be referred to as time in terms of writing and reading these waveforms to and from at least a portion of a track 122 on the rotating disk surface 120-1. As recorded on the disk surface, they all can be represented as a function of one real variable, the angular placement within the track.

As used herein a function of one real variable is of compact support if there exists a close interval upon which the function may be non-zero, and outside of which the function is zero. As used herein, real numbers refers to a set of all integers, fractions of integers where the denominators are non-zero, and the limit points of all convergent sequences of fractions. A function of one real variable is a function from the real numbers to real numbers, providing a real number result for each real number "input".

The set of all value results of a function form its range and the set of all possible inputs to the function forms its domain. A real valued function has a domain of the real numbers and a range within the real numbers. By way of example the real valued function $x^2$ has a range of all non-negative real numbers, whereas the real valued function $x^3$ has a range of all real numbers.

Much of the sampling work of this invention's embodiments will use a fixed point range of integers (say all 10 bit signed integers) which are normalized to fractions between −1 and 1, with sampling typically performed at discrete times. One may ask: why start with real numbers and continuous functions? The reason is that it is better to start where things can be continuous and then discuss the discretization of the subject.

A closed interval [a,b] is a set of all real numbers x such that $a<=x$ and $x<=b$, where $a<b$ and both a and b are real numbers. An open interval (a,b) is a set of all real numbers such that $a<x$ and $x<b$.

As used herein, the length of the closed interval [a,b] is b−a.

The lower-half of the closed interval [a,b] is the open interval $(a, a+(b-a)/2)=(a, (a+b)/2)$ And the upper-half of the closed interval [a,b] is the open interval $(a+(b-a)/2, b)=((a+b)/2, b)$.

The support interval of a function of compact support refers to the smallest closed interval in which the function is non-zero within the interval and zero outside the interval for the function. So if [a,b] is the support interval of a function f of compact support, then $f(x) \approx 0$ if $a<x<b$ and $f(x)=0$ if $x<a$ or $x>b$. It can be proven that for each continuous function of compact support there exists a unique support interval for that function.

As used herein, a real valued function f is continuous if for any point y in the range of the function, where f(x)=y, and for any real number ϵ>0 there exists a real number δ>0, if for any z in the domain such that x−δ<z<x+δ, then y−ϵ<f(z)<y+ϵ.

An interval transformation of the interval [a,b] is a real valued function with range [a,b] of compact support having a support interval of [a,b].

A half interval transformation is an interval transformation mapping the lower half interval to the upper half interval and mapping the upper half interval to the lower half interval. We will be using a specific half interval transformation S of a closed interval [a,b], which operates as follows:

S maps the lower half interval to the upper half interval by transforming x∈(a, (a+b)/2) to S(x)=x+(b−a)/2.

And S maps the upper half interval to the lower half interval by transforming x∈((a+b)/2, b) to S(x)=x−(b−a)/2.

A real valued function $f$ of compact support with support interval [a,b] is anti-symmetric about the simple half interval transformation S of [a,b] refers to a function such that for any x∈(a,b), $f(S(x))=-f(x)$.

An approximate anti-symmetric real valued function $f$ of compact support with support interval [a,b] is approximately anti-symmetric to within some small real number ϵ>0 about the simple half interval transformation S of [a,b] refers to a function such that for any x∈(a,b) then $-f(x)-\epsilon<f(S(x))<-f(x)+\epsilon$.

A short transition-pair waveform 3050 of bit cell time length T is an approximate anti-symmetric real value function $F_{3050}$ of compact support having a support interval of length 2T.

A simulated long transition-pair waveform 3060 is the result of time offset adding N instances of the short transition-pair waveform $$F_{3060}(t) = \sum_{k=0}^{N-1} F_{3050}(t + kT).$$

This is essentially the long transition-pair waveform pattern 3020 written to the track 122 on the rotating disk surface 120-1.

The process of writing and then playing back the long transition-pair waveform pattern can be summarized as a playback process, so that the read data 3080 of the written long transition-pair waveform pattern 3020 is the long transition-pair waveform 3040, which is a non-linear distortion of the simulated long transition-pair waveform 3060.

Figure 12A:
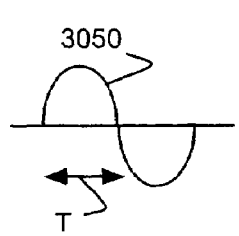
FIGS. 12A and 12D show examples of waveforms which may be successfully used with embodiments of the invention.
Figure 12B:
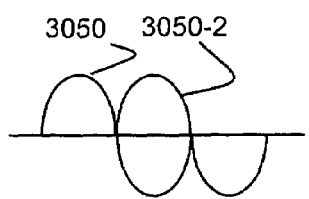
FIG. 12B shows two time offset instances of the short transition-pair waveform of FIG. 12A resulting in the simulated long transition-pair waveform of FIG. 12C.
Figure 12C:
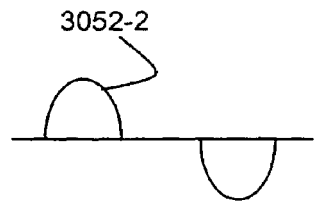
FIG. 12E shows two time offset instances of the short transition-pair waveform of FIG. 12D resulting in the simulated long transition-pair waveform of FIG. 12F.
FIGS. 12G and 12J show examples of less suitable short transition-pair waveforms when used with embodiments of the invention.
FIG. 12H shows two time offset instances of the short transition-pair waveform of FIG. 12G resulting in the simulated long transition-pair waveform of FIG. 12I.
FIG. 12K shows two time offset instances of the short transition-pair waveform of FIG. 12J resulting in the simulated long transition-pair waveform of FIG. 12L.
Figure 12D:
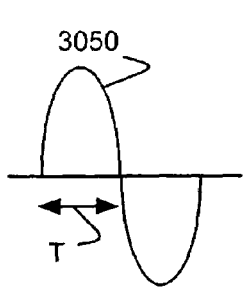
Figure 12E:
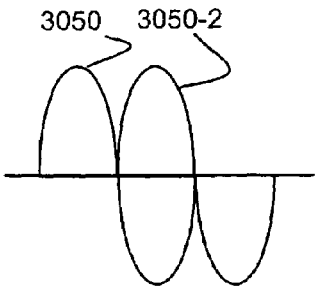
Figure 12F:
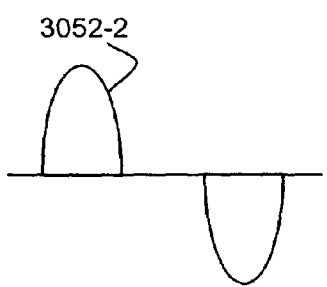

FIGS. 3A and 10A to 12L show examples of the short transition-pair waveform 3050, the long transition-pair waveform 3040. The horizontal axis of each of these Figures represents time and the vertical axis represents sample strength which has been normalized to a range of −1 to +1. Some waveforms may be preferred for the short transition-pair waveform. FIGS. 12A to 12F discuss two examples of suitable short transition-pair waveforms and FIGS. 12G to 12L discuss two less suitable waveforms:

FIGS. 12A and 12D show two preferred examples of the short transition-pair waveform 3050 which are essentially symmetric about their respective peaks in their positive pulses and their negative pulses, where both the negative and positive pulses essentially mirror each other through time. When these waveforms are added to their time-offset instances as shown in FIGS. 12B and 12E, the resulting middle pulses are essentially removed as shown in FIGS. 12C and 12F. Such short transition-pair waveforms would indicate linear property, which is the essential for reconstructing the simulated long transition pair waveform.

Figure 12G:
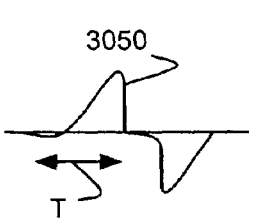
Figure 12H:
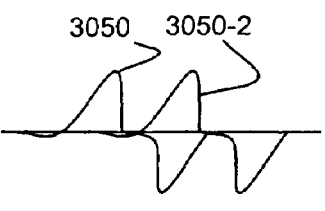
Figure 12I:
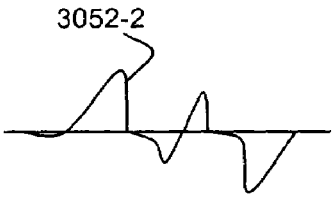
Figure 12J:
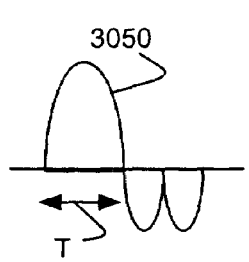
Figure 12K:
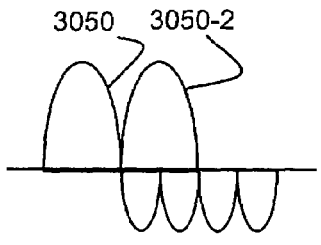
Figure 12L:
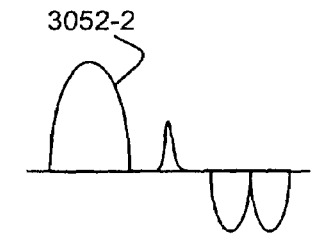

FIGS. 12G and 12J show less preferred examples of the short transition-pair waveform 3050. FIG. 12G shows a waveform with asymmetric positive and negative pulses, which when a time-offset instance 3050-2 is added as shown in FIG. 12H, result in an simulated long transition-pair waveform 3052-2 with interference noise in the middle pulse area, where the positive and negative pulses did not cancel each other as shown in FIG. 12I. FIG. 12J shows a waveform with one positive and two negative pulses, which when a time-offset instance 3050-2 is added as shown in FIG. 12K, result in an simulated long transition-pair waveform 3052-2 with interference noise in the middle pulse area, where the positive and negative pulses did not cancel each other as shown in FIG. 12L. In normal situation, case 12G and 12J are not possible. However, if the reader is not working properly, such waveforms are possibly observed. In such case, these heads can be identified and rejected.

Figure 8F:
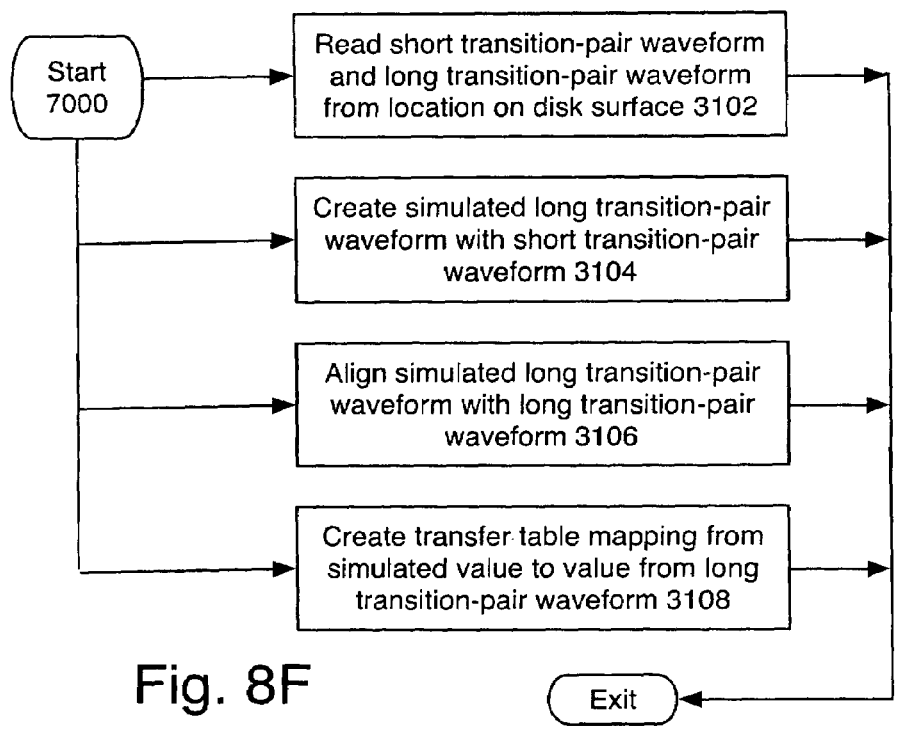
FIG. 8F show an alternative flowchart to FIG. 8A.

The first method will be discussed in detail using the second program system introduced in FIG. 1B. However, the first method can be discussed in general terms through the example of FIG. 1A as follows:

The processor 510 reads said short transition-pair waveform 3050 and said long transition-pair waveform 3040 from their location on said rotating disk surface 120-1 in said assembled hard disk drive 10. This step will be further discussed in terms of operation 3102 of FIGS. 8A and 8F.

The processor constructs said simulated long transition pair waveform 3060 by shift-adding said short transition pair waveform. This step will be further discussed in terms of operation 3104 of FIGS. 8A and 8F.

The processor aligns said peaks of simulated long transition-pair waveform with said long transition-pair waveform. This step will be further discussed in terms of operation 3106 of FIGS. 8A and 8F.

And the processor creates said transfer table 3070 from said aligned value of said simulated long transition-pair waveform versus said long transition-pair value. This step will be further discussed in terms of operation 3108 of FIGS. 8A and 8F.

Before considering the first method in terms of the second program system 3100, some terms will be defined. A computer as used herein may include at least one instruction processor and at least one data processor, where each of the data processors is directed by at least one of the instruction processors.

Several Figures show flowcharts of various aspects and/or details of the invention's methods and possess arrows. These arrows will signify of flow of control and sometimes data, supporting implementations including at least one program step or program thread executing upon a computer, inferential links in an inferential engine, state transitions in a finite state machine, and learned responses within a neural network.

The operation of starting a flowchart refers to at least one of the following and is denoted by an oval with the text "Start" in it. Entering a subroutine in a macro instruction sequence in a computer. Entering into a deeper node of an inferential graph.

Directing a state transition in a finite state machine, possibly while pushing a return state. And triggering at least one neuron in a neural network.

The operation of termination in a flowchart refers to at least one of the following and is denoted by an oval with the text "Exit" in it. The completion of those steps, which may result in a subroutine return, traversal of a higher node in an inferential graph, popping of a previously stored state in a finite state machine, return to dormancy of the firing neurons of the neural network.

An operation in a flowchart refers to at least one of the following. The instruction processor responds to the step as a program step to control the data execution unit in at least partly implementing the step. The inferential engine responds to the step as nodes and transitions within an inferential graph based upon and modifying a inference database in at least partly implementing the step. The neural network responds to the step as stimulus in at least partly implementing the step. The finite state machine responds to the step as at least one member of a finite state collection comprising a state and a state transition, implementing at least part of the step.

A flowchart may include multiple operations or program steps. In certain aspects, any one of the steps may be found in an embodiment of the invention. In other aspects, multiple steps are needed in an embodiment of the invention. When multiple steps are needed, these steps may be performed concurrently, sequentially and/or in a combination of concurrent and sequential operations. The shapes of the arrows in multiple step flowcharts may differ from one flowchart to another, and are not to be construed as having intrinsic meaning in interpreting the concurrency of the steps.

The first method will now be discussed in terms of the second program system 3100, residing in the second memory 3004 second accessibly coupled 3002 to the embedded computer 3000 in the embedded circuit 500 directing the hard disk drive 10 of FIG. 1B, as further shown in FIG. 8A.

Figure 9A:
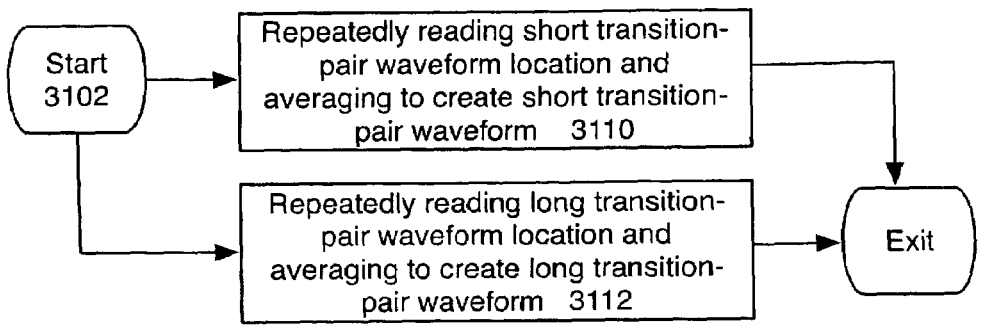
FIGS. 9A to 9C show some details of the operations of the flowchart of FIG. 8A.

Operation 3102 of FIG. 8A supports reading the short transition-pair waveform 3050 and the long transition-pair waveform 3040 from their location on the rotating disk surface 120-1. As stated above, the location may include a track 122, a sector 124 of the track, multiple sectors and/or multiple tracks. FIG. 1B shows these waveforms residing in the second memory 3004, however, in certain embodiments, these activities may be performed by the servo computer 610, and thus the waveforms may then reside in the memory 620 and the program system 1000 may perform the operations of FIG. 8A. Alternatively, a finite state machine may perform these operations in a memory accessibly coupled to it. This application will focus on the embedded computer, its second program system and the second memory. This is not meant to limit the scope of the claims, but rather to simplify the discussion. Looking at this operation in greater detail:

Operation 3102 may further, preferably include at least one of the operations of FIG. 9A. Operation 3110 supports repeatedly reading the short transition-pair location and averaging to create the short transition-pair waveform 3050. Operation 3112 supports reading the long transition-pair location and averaging to create the long transition-pair waveform 3040.

The reading of the short transition-pair waveform 3050 and the long transition-pair waveform 3040 may preferably use the preamplifier 24 to provide these waveforms. The preamplifier's gain may be a constant for the range of the input signals from the reader device, may preferably be pre-determined to offer the most linear performance. The read head may use a spin valve or a tunneling valve to read the data on the rotating disk surface.

Figure 3A:
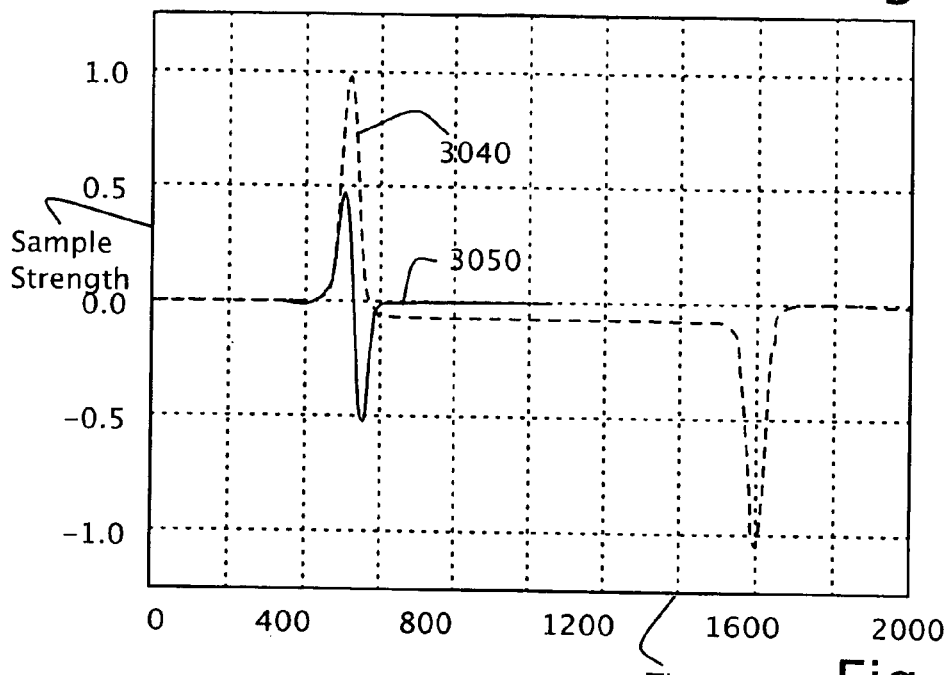
FIG. 3A shows an example of the long transition-pair waveform and the short transition-pair waveform used in the inventions method of calibrating the playback function.
Figure 9B:
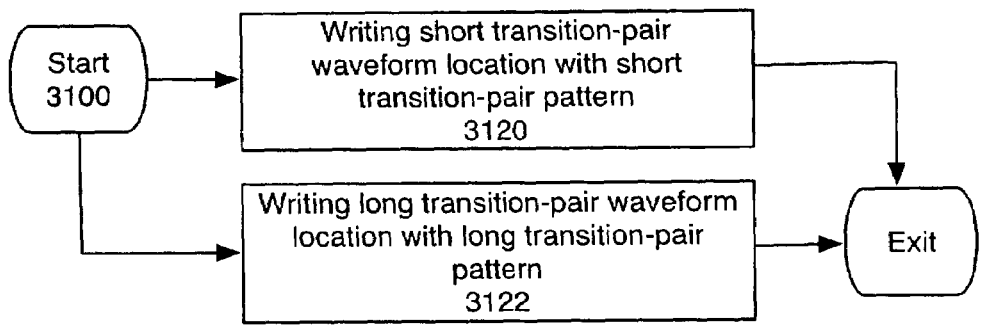
Figure 9C:
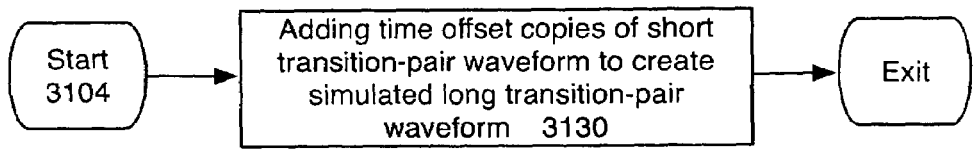

Operation 3104 of FIG. 8A supports of the creation of the simulated long transition-pair waveform 3060 from short transition-pair waveform 3050 and aligning the peaks of the simulated long transition-pair waveform with the long transition-pair waveform 3040. The inventors have found through their experiments that the long transition-pair waveform will tend to exhibit the non-linear effects far stronger than the short transition-pair waveform, so that by creating a simulated long transition-pair waveform with the short transition-pair waveform (presumably being linear) and comparing with the long transition-pair waveform (presumably with nonlinear distortion), they can achieve a map of this non-linearity, which is shown as the transfer table 3070 in FIGS. 1 and 3B. The long transition-pair waveform is shown in FIG. 3A having two peaks, but taking a much longer time (the horizontal axis) to achieve these peaks than the short transition-pair waveform. In greater detail:

Operation 3104 may further include operation 3130 of FIG. 9C, which supports adding time offset instances of the short transition-pair waveform 3050 to create the simulated long transition-pair waveform 3060.

Figures 10A, 10B:
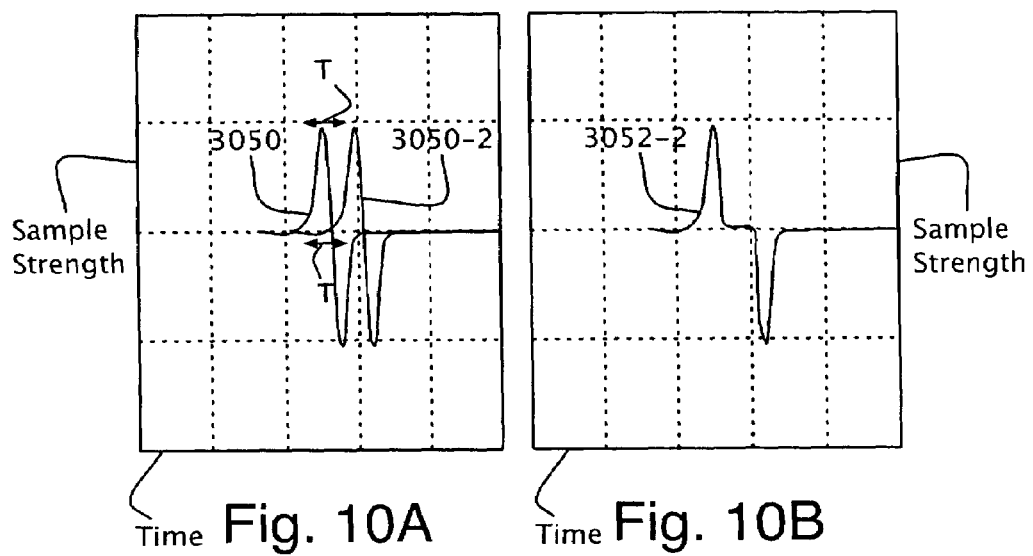
FIG. 10A shows two time offset instances of the short transition-pair waveform of FIG. 3A resulting in the simulated long transition-pair waveform of FIG. 10B.

By way of example, FIG. 10A shows two time offset instances of the short transition-pair waveform 3050, with the second instance labeled 3050-2 time offset from the short transition-pair waveform. Adding these two waveforms together assuming linear super-positioning leads to the two instance simulated long transition-pair waveform 3052-2 shown in FIG. 10B.

Figures 10C, 10D:
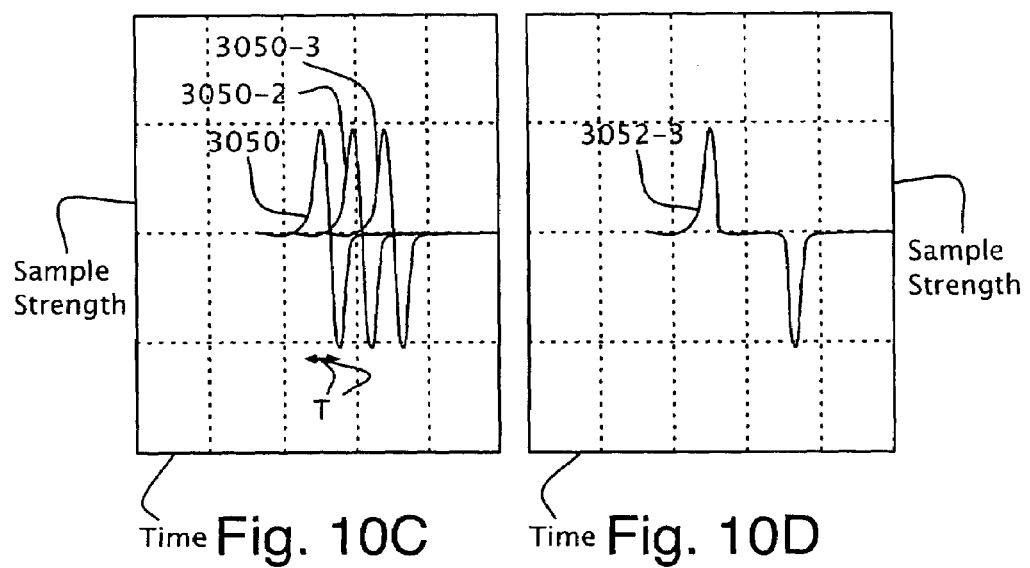
FIG. 10C shows three time offset instances of the short transition-pair waveform of FIG. 3A resulting in the simulated long transition-pair waveform of FIG. 10D.

A second example, FIG. 10C shows three time offset instances, with the second instance labeled 3050-2 time offset from the short transition-pair waveform 3050, and the third instance 3050-3 time offset from the second instance. Adding these three waveforms together assuming linear super-positioning leads to the two instance simulated long transition-pair waveform 3052-3 shown in FIG. 10D.

As used herein, the bit cell time length T of FIG. 1 represents the time taken to sample a bit cell. This is further shown in FIGS. 10A and 10C as the time-offset of the second instance 3050-2 from the short transition-pair waveform 3050 and the time-offset of the third instance 3050-3 from the second instance.

Figure 11:
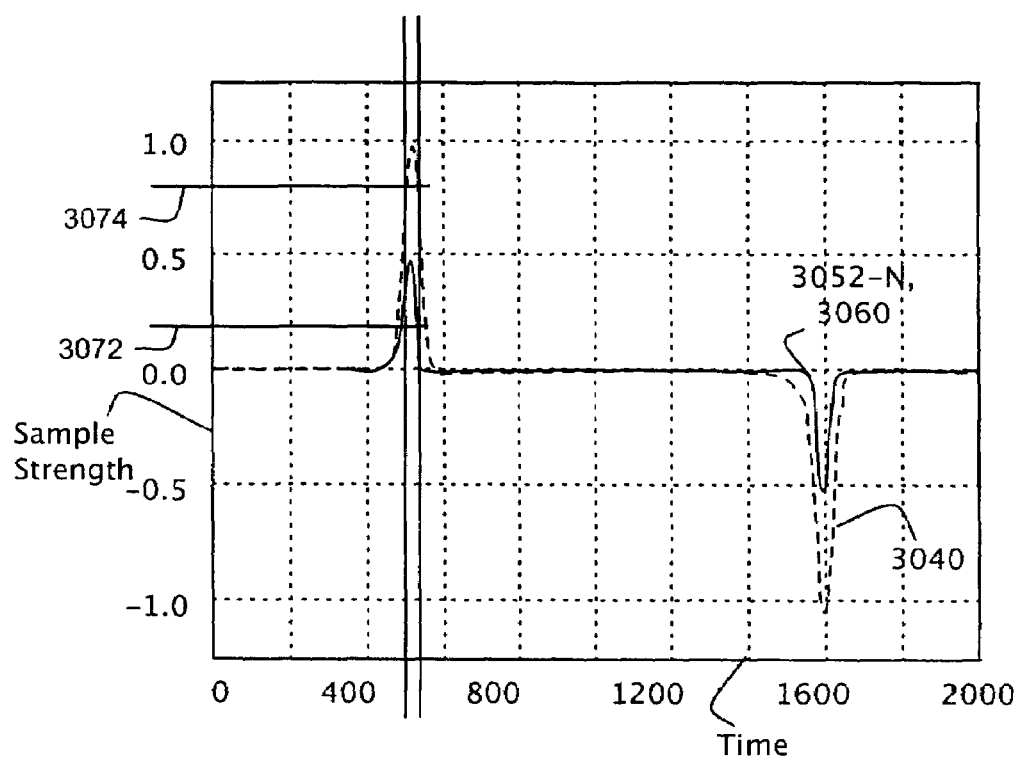
FIG. 11 shows the simulated long transition-pair waveform derived from the short transition-pair waveform of FIG. 3B.

A third example, FIG. 11 shows the result of adding N time offset instances of the short transition-pair waveform 3050 to create the N instance simulated long transition-pair waveform 3052-N, which is the simulated long transition-pair waveform 3060 of FIG. 1. Adding N of these time-offset instances together can be represented in terms of sampling the short transition-pair waveform s(t) to create the simulated long transition-pair waveform $f(t)$ as (0.1)

$$f(t) = \sum_{n=0}^{N-1} s(t - nT)$$

T is theoretically defined as the time length for one bitcell, however in certain embodiments, it may empirically approximate the time length for one bitcell. The long transition-pair waveform is preferably equivalent to concatenating two isolated transitions (opposite polarity) with an integer number N bit cells separation, which is exactly the storage scheme in common use in hard disk drives. The short transition-pair waveform is preferably equivalent to concatenating two isolated transitions (opposite polarity) with one bit cell separation. It is architecturally compatible with the sector data payload 126-D of the sector 124 as shown in FIG. 8D and is readily compatible to the data stored in a track.

The adding of these time-offset instances of the short transition-pair waveform 3050 simulates the effect of linear super-positioning of the individual bit cells, creating the simulated long transition-pair waveform 3060 as an approximation of the idealized long transition-pair waveform 3040.

Figure 3B:
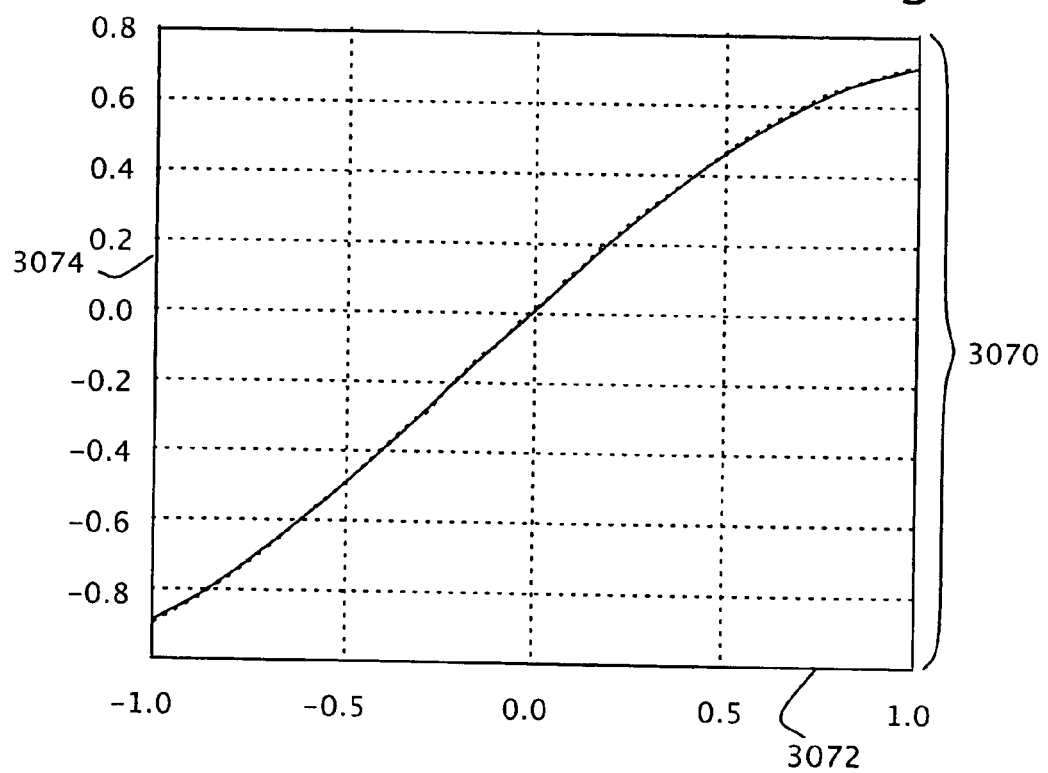
FIG. 3B shows the transfer table resulting from the invention's method.
Figure 4:
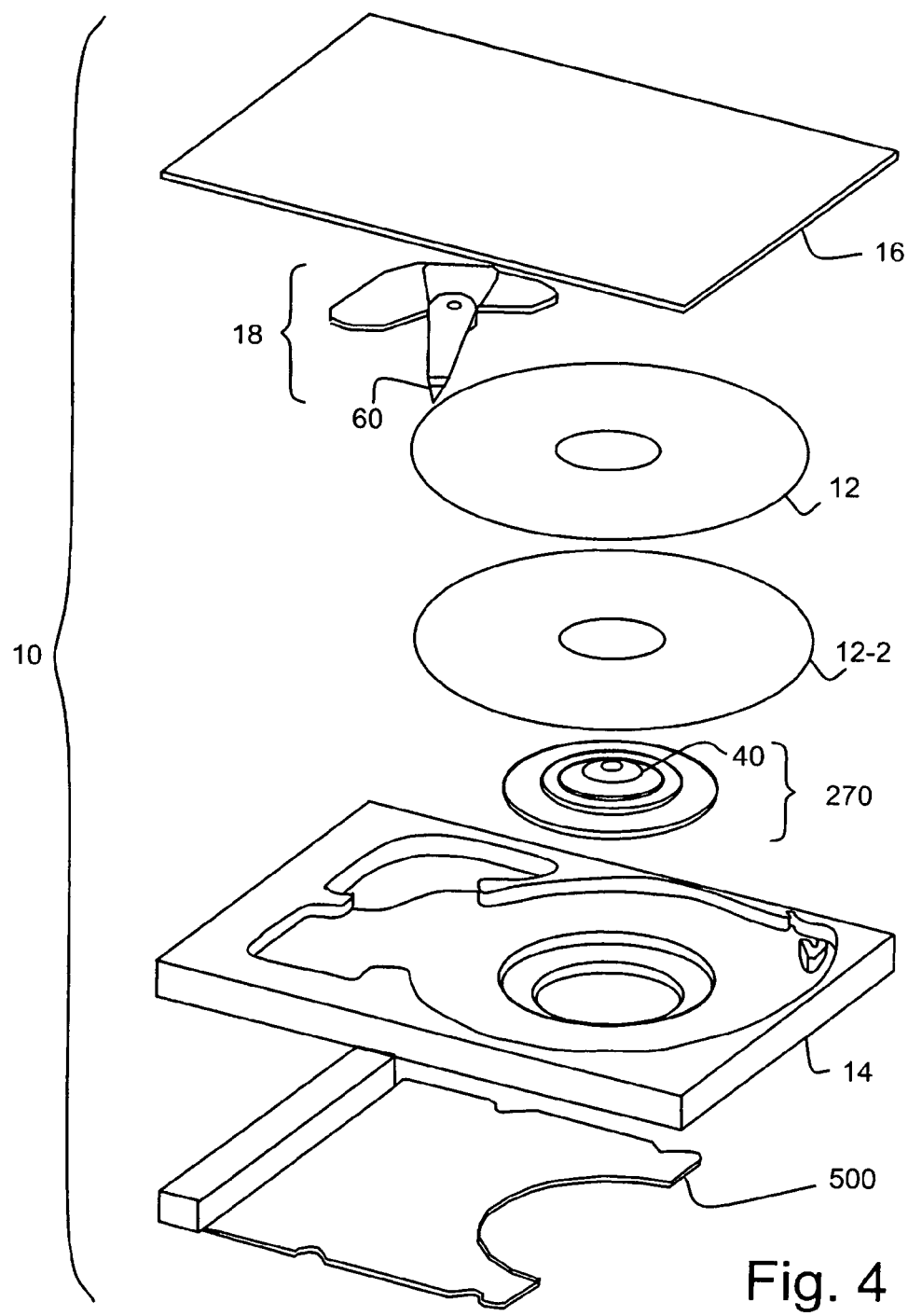
FIGS. 4 and 5 show some details of the hard disk drive of FIGS. 1A, 1B, 1C and 2A.

Operation 3106 of FIG. 8A supports creating the transfer table 3070 as an aligned value from the simulated long transition-pair waveform 3072 mapping to the long transition-pair value 3074, as shown in FIGS. 3B and 11. At each aligned x axis location, there is one simulated long transition-pair waveform value (it is linearly representing the input) and one long transition-pair waveform value (it is representing playback nonlinear output). The transfer table is a mapping of the input value and output value. In certain embodiments, the transfer table may be represented by a non-linear compensation function, which may be represented as a set of nonlinear correction factors.

The first method may further, preferably include writing to the disk 12 to create versions of the short transition-pair and long transition-pair waveforms, as shown in FIG. 9B. Operation 3120 supports writing a short transition-pair pattern 3030 to create a version of the short transition-pair waveform 3050 on the rotating disk surface 120-1, preferably at a short transition-pair waveform location, which may preferably be a track 122 and/or at least one sector 124 of the track. Operation 3122 supports writing a long transition-pair pattern 3020 to the long transition-pair waveform location to similarly create a version of the long transition-pair waveform 3050.

This first method has several advantages: calibration is done in the assembled hard disk drive 10, which minimizes the requirements on the quasi-static tester. It assures a more accurate calibration, which is directly applicable to the assembled hardware in its normal operating environment, and supports time varying test patterns more closely approximating the actual normal operating conditions of the hard disk drive. It is more accurate since it is based on the field from the real media with the data patterns consistent with the coding schemes that will actually be employed in the hard disk drive. These coding schemes typically implement either a Non-Recurring Zero (NRZ) coding scheme as shown in FIG. 8B, or a Non-Recurring Zero Inverse (NRZI) coding scheme as shown in FIG. 8C.

Figure 2A:
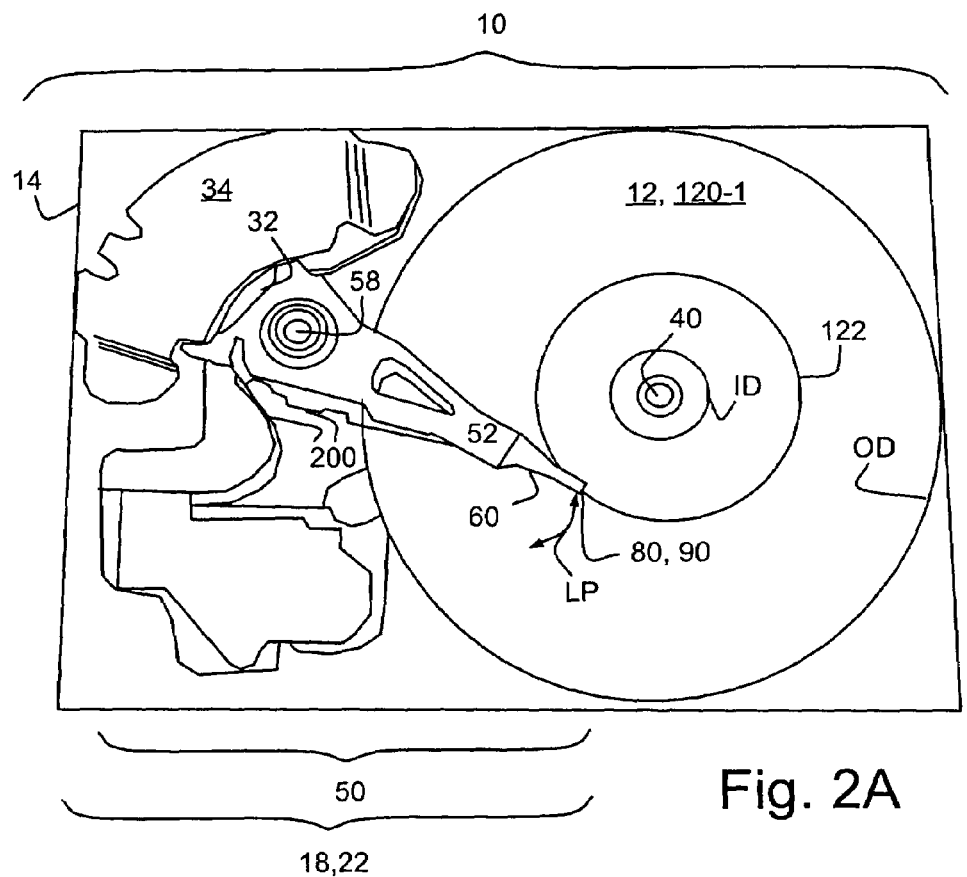
FIG. 2A shows a partially assembled hard disk drive of FIGS. 1A to 1C and 1G.

The first method may preferably be performed on several tracks on the rotating disk surface 120-1, which will be referred to as tested tracks. These tested tracks may preferably be distributed across the rotating disk surface from the Inside Diameter ID to the Outside Diameter OD as shown in FIG. 2A. It may preferably be performed on each of the rotating disk surfaces in the hard disk drive 10 used for data access.

The result of the transfer table 3070 and/or nonlinear correction factors can be saved in a non-volatile memory component of embedded circuit 500 or on a dedicated area of a rotating disk surface 120-1. A memory component is volatile if it loses its memory contents when there is no power, and non-volatile otherwise. The saved information can be recovered each time when the hard disk drive 10 is powered up. The non-volatile memory component may be included in the memory 620 and/or the second memory 3004.

The transfer table 3070 can be used for nonlinear distortion correction on any waveform. The nonlinear distortion correction procedure is that, for each waveform output, using transfer table, taking this value as the output data 3076O of the transfer table, finding its corresponding linear input data 3076I. The waveform generated from the corresponding input data is corrected from the nonlinear distortion found in the playback sample 3082 of a track 122 on the rotating disk surface 120-1.

The invention's second method includes a hard disk drive 10 using the transfer table 3070 to compensate for non-linear playback distortion in the read data 3080 of a track 122 to create the adjusted read data 3090, which will be discussed in terms of FIGS. 1B, 1C, and 9D to 9F. The adjusted read data is a product of this second method.

By way of example, FIG. 1C shows the hard disk drive 10 and an embedded circuit 500 including a processor 510 implementing the second method. As used herein, the processor includes at least one instance of at least one controller 512, wherein each controller includes at least one input 514, maintains and alters at least one state 516, and generates at least one output 518 based upon at least one of the inputs and/or at least one of the states as shown in FIG. 1F.

The transfer table 3070 preferably includes at least two data pairs, which are shown in FIG. 1D as the data pair 3076 and the second data pair 3076-2. Each data pair may includes an input data 3076I and an output data 3076O as shown in FIG. 1E.

Figure 1G:
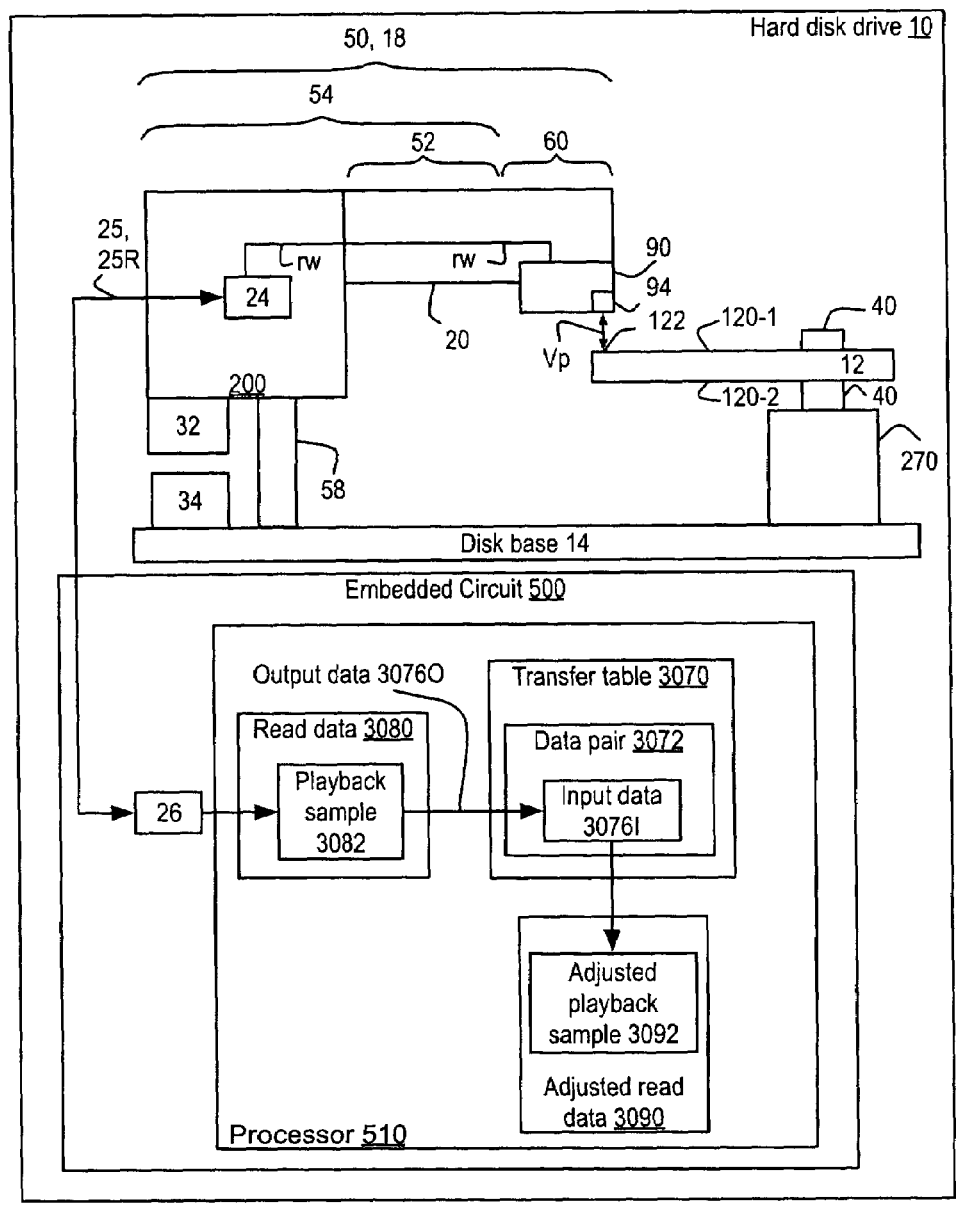
FIG. 1G shows some details of an example of the processor of FIGS. 1A to 1C and 1F.

In certain embodiments of the invention, the transfer table 3070 may preferably include one data pair 3076 for each possible value of the playback sample 3082. Further, the transfer table may include an array of the input data arranged at successive addresses corresponding to the output data. The output data of the data pair may be used as the address of the input data in the array as shown in FIG. 1G. The processor 510 may preferably receive from the channel interface 26 the playback sample, use the playback sample to provide the address of the corresponding input data, which is read to create the adjusted playback sample 3092. In certain embodiments of the invention's hard disk drive 10, the processor may preferably act as the embedded computer 3000 of FIG. 1B.

Figure 9D:
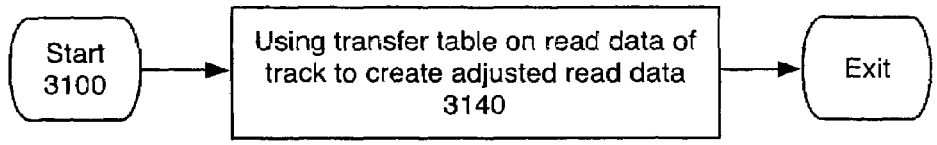
FIGS. 9D to 9F show some details of the second program system supporting inventions second method using the transfer table to create an adjusted read data from the read data of a track on the rotating disk surface of FIGS. 1B, 1C, and 1G.
Figure 9D:
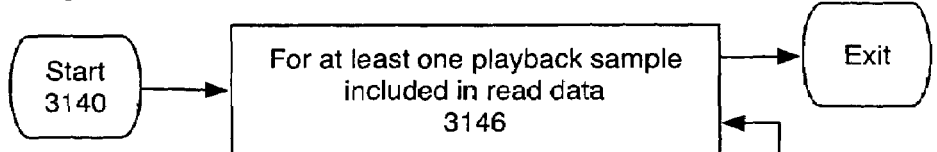

By way of example, the second method is shown in FIG. 9D using the transfer table 3070 as implemented the second program system 3100 of FIG. 1B. The second program system includes operation 3140 supporting using the transfer table on the read data 3080 of the track 122 to create the adjusted read data 3090.

Figure 9E:
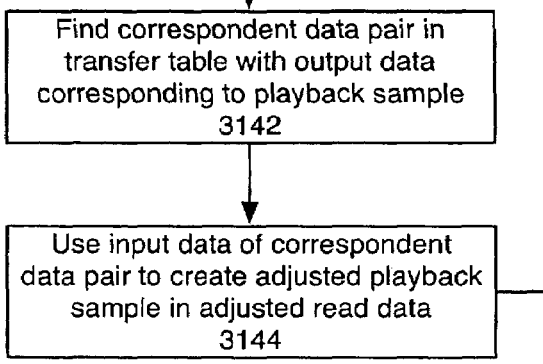
Figure 9F:
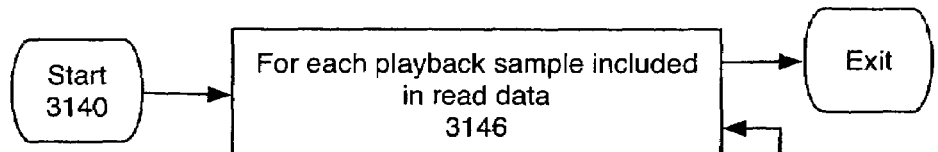
Figure 9F:
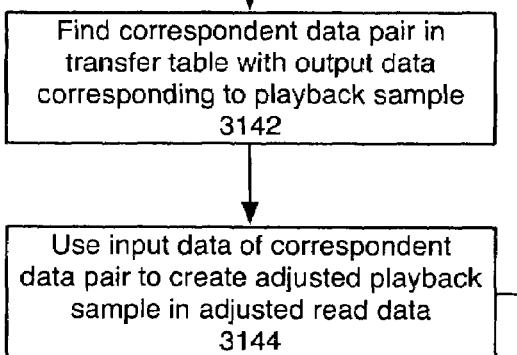

FIGS. 9E and 9F show some alternatives in the detail of the flowchart of FIG. 9D supporting the second method:

Both Figures show operation 3142, for at least one playback sample 3082, finding the correspondent data pair 3076 in the transfer table 3070 with the output data 3076O corresponding to the playback sample.

Both show operation 3144 using the input data 3076I to create the adjusted playback sample 3092 included in the adjusted read data 3090.

FIG. 9E shows performing these two operations, 3142 and 3144, for at least one of the playback sample 3082 included in the read data 3080.

Alternatively, FIG. 9F shows performing operations 3142 and 3144 for each of the playback sample included in the read data.

The invention includes the hard disk drive 10 implementing the second method and including the transfer table 3070 and the adjusted read data 3090, where for at least one track 122 of at least one rotating disk surface 120-1 included in the hard disk drive, the transfer table is used on the read data 3080 of the track to create the adjusted read data 3090 for the track.

The invention includes manufacturing the embedded circuit 500 by providing the processor 510 and the transfer table 3070 to create the embedded circuit, which is the product of this process. Providing the processor may further include program the second program system 3100, which may further include writing into a non-volatile memory component of the second memory 3004.

The invention includes manufacturing the hard disk drive using the first method, that hard disk drive 10 as a product of the invention's manufacturing process. Manufacturing the hard disk drive includes performing the invention's first method of calibrating as shown in the second program system in FIGS. 8A, 9A, 9B and/or 9C to create the transfer table 3070 in the second memory 3004.

Further details of the hard disk drive 10, shown in FIGS. 1B, 1C, 1G, 2A, 4, and 5, include the head stack assembly 50 pivotably mounted through the actuator pivot 58 on a disk base 14 and arranged for the slider 90 of the head gimbal assembly 60 to be laterally positioned LP near the data 122 for the read-write head 94 to access the data on the rotating disk surface 120-1. The disk 12 is rotatably coupled to the spindle motor 270 by the spindle shaft 40. The head stack assembly is electrically coupled to an embedded circuit 500. The data may be organized on the rotating disk surface either as a radial succession of concentric circular tracks or a radial succession of joined spiral tracks.

The hard disk drive 10 may include the servo controller 600, and possibly the embedded circuit 500, coupled to the voice coil motor 18, to provide the micro-actuator stimulus signal 650 driving the micro-actuator assembly 80, and the read signal 25-R based upon the amplified read signal ar0 contained in the read-write signal bundle rw from the read-write head 94 to generate the Position Error Signal 260.

The embedded circuit 500 may preferably include the servo controller 600, as shown in FIG. 1, which may further include a servo computer 610 accessibly coupled 612 to a memory 620. A program system 1000 may direct the servo computer in operating the hard disk drive 10. The program system preferably includes at least one program step residing in the memory. The embedded circuit may preferably be implemented with a printed circuit technology. The lateral control signal 82 may preferably be generated by a micro-actuator driver 28. The lateral control signal preferably includes the first lateral control signal 82P1 and the second lateral control signal 82P2, as well as the AC lateral control signal 82AC.

The voice coil driver 30 preferably stimulates the voice coil motor 18 through the voice coil 32 to provide coarse position of the slider 90, in particular, the read head 94-R near the track 122 on the rotating disk surface 120-1.

Figure 2B:
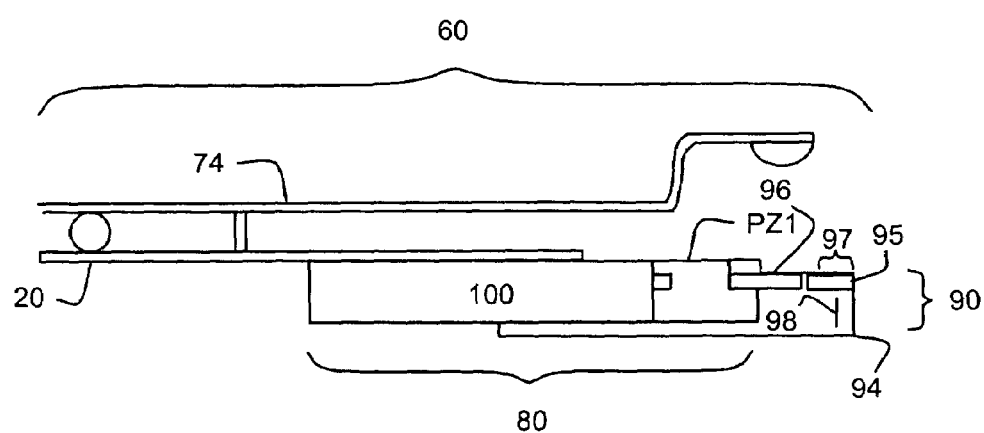
FIG. 2B shows an example of the head gimbal assembly of FIG. 2A including the slider coupled with a micro-actuator assembly.

The embedded circuit 500 may further process the read signal 25-R during the read access to the data 122 on the rotating disk surface 120-1. The slider 90 may report the amplified read signal ar0 as the result of a read access of the data 122 on the rotating disk surface 120-1. The flexure finger 20 may provide the read trace path rtp for the amplified read signal, as shown in FIG. 2B. The main flex circuit 200 may receive the amplified read signal from the read trace path to create the read signal 25-R. The embedded circuit receives the read signal to read the data on the rotating disk surface.

Figure 5:
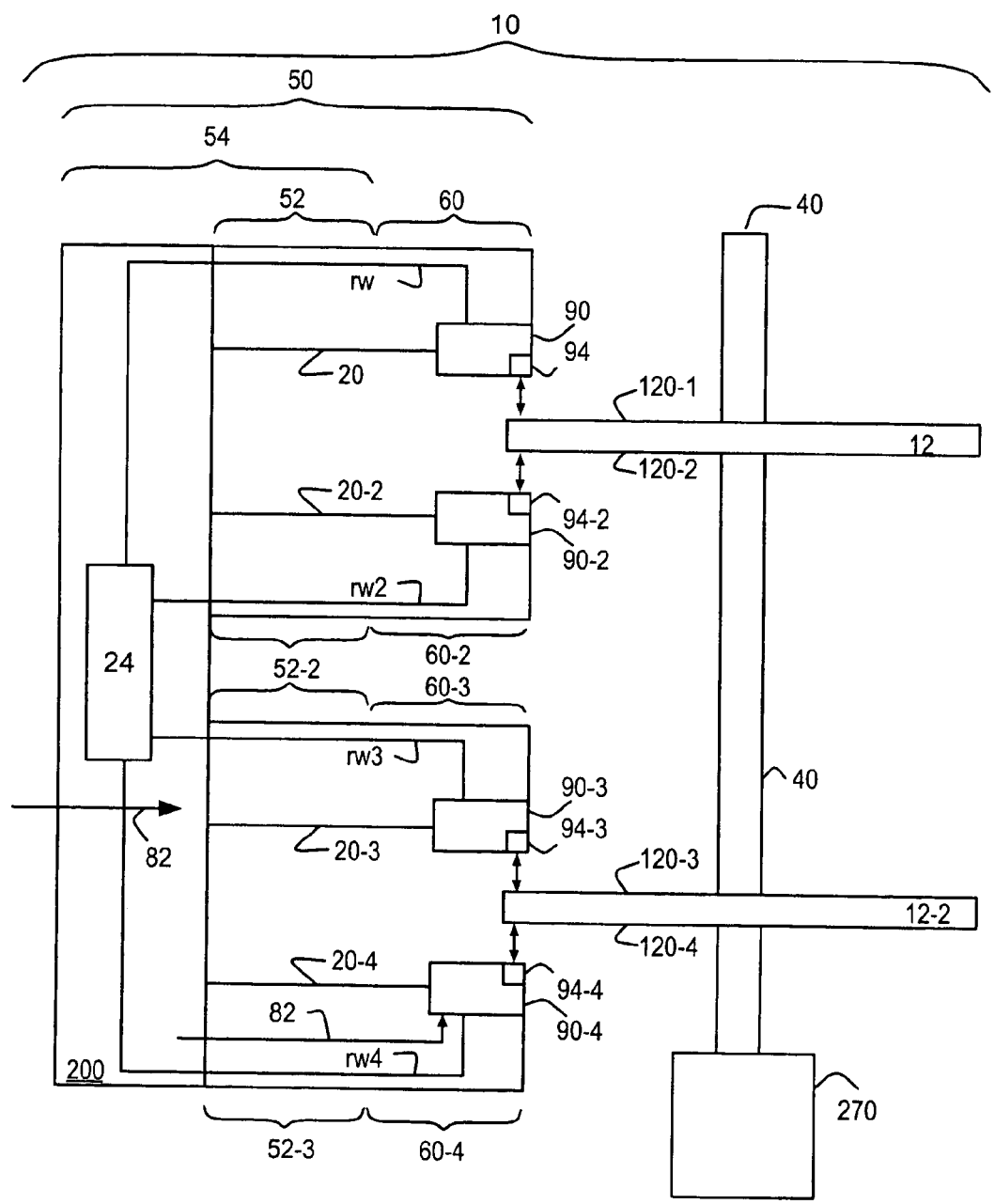

Looking at some of the details of FIG. 5, the hard disk drive 10 includes a disk 12 and a second disk 12-2. The disk includes the rotating disk surface 120-1 and a second rotating disk surface 120-2. The second disk includes a third rotating disk surface 120-3 and a fourth rotating disk surface 120-4. The voice coil motor 18 includes an head stack assembly 50 pivoting through an actuator pivot 58 mounted on the disk base 14, in response to the voice coil 32 mounted on the head stack 54 interacting with the fixed magnet 34 mounted on the disk base. The actuator assembly includes the head stack with at least one actuator arm 52 coupling to a slider 90 containing the read-write head 94. The slider is coupled to the micro-actuator assembly 80.

The read-write head 94 interfaces through a preamplifier 24 on a main flex circuit 200 using a read-write signal bundle rw typically provided by the flexure finger 20, to a channel interface 26 often located within the servo controller 600. The channel interface often provides the Position Error Signal 260 (PES) within the servo controller. It may be preferred that the micro-actuator stimulus signal 650 be shared when the hard disk drive includes more than one micro-actuator assembly. It may be further preferred that the lateral control signal 82 be shared. Typically, each read-write head interfaces with the preamplifier using separate read and write signals, typically provided by a separate flexure finger. For example, the second read-write head 94-2 interfaces with the preamplifier via a second flexure finger 20-2, the third read-write head 94-3 via the a third flexure finger 20-3, and the fourth read-write head 94-4 via a fourth flexure finger 20-4.

During normal disk access operations, the hard disk drive 10 operates as follows when accessing the data 122 on the rotating disk surface 120-1. The spindle motor 270 is directed by the embedded circuit 500, often the servo-controller 600, to rotate the disk 12, creating the rotating disk surface for access by the read-write head 94. The embedded circuit, in particular, the servo controller drives the voice coil driver 30 to create the voice coil control signal 22, which stimulates the voice coil 32 with an alternating current electrical signal, inducing a time-varying electromagnetic field, which interacts with the fixed magnet 34 to move the voice coil parallel the disk base 14 through the actuator pivot 58, which alters the lateral position LP of the read-write head of the slider 90 in the head gimbal assembly 60 coupled to the actuator arm 52, which is rigidly coupled to the head stack 54 pivoting about the actuator pivot. Typically, the hard disk drive first enters track seek mode, to coarsely position the read-write head near the data, which as stated above, is typically organized as a track. Once the read-write head is close to the track, track following mode is entered. Often this entails additional positioning control provided by the micro-actuator assembly 80 stimulated by the lateral control signal 82, which is driven by the micro-actuator driver 28. Reading the track may also include generating a Position Error Signal 260, which is used by the servo controller as positioning feedback during track following mode.

The hard disk drive 10 may operate by driving the vertical control signal VcAC to stimulate the vertical micro-actuator 98 to alter the vertical position Vp of the slider 90 by providing a potential difference to the first slider terminal SP1. This operation may be performed when seeking a track 122 of data on the rotating disk surface 120-1, and/or when following the track on the rotating disk surface. The servo controller 600 may include means for driving the vertical control signal, which may be at least partly implemented by the vertical control driver 29 creating the vertical control signal to be provided to the vertical micro-actuator. The vertical control driver is typically an analog circuit with a vertical position digital input 290 driven by the servo computer 610 to create the vertical control signal.

Track following and track seeking may be implemented as means for track seeking and means for track following, one or both of which may be implemented at least in part as program steps in the program system 1000 residing in the memory 620 accessibly coupled 612 to the servo computer 610 shown in FIG. 1. Alternatively, the means for track seeking and/or the means for track following may be implemented as at least one finite state machine.

The slider, and its read-write head may include a read head using a spin valve to read the data on the rotating disk surface, or use a tunneling valve to read the data. The slider may further include the read head providing a read differential signal pair to an amplifier to generate an amplified read signal reported by the slider as a result of the read access of the data on the rotating disk surface. The amplifier may be opposite the air bearing surface, and may be separate from the deformation region, and may further be separate from the vertical micro-actuator. The slider may include a vertical micro-actuator driven by a vertical micro-actuator control signal providing a potential difference to a first slider power terminal to stimulate the vertical micro-actuator to alter the vertical position of the read-write head above the rotating disk surface.

Figure 6A:
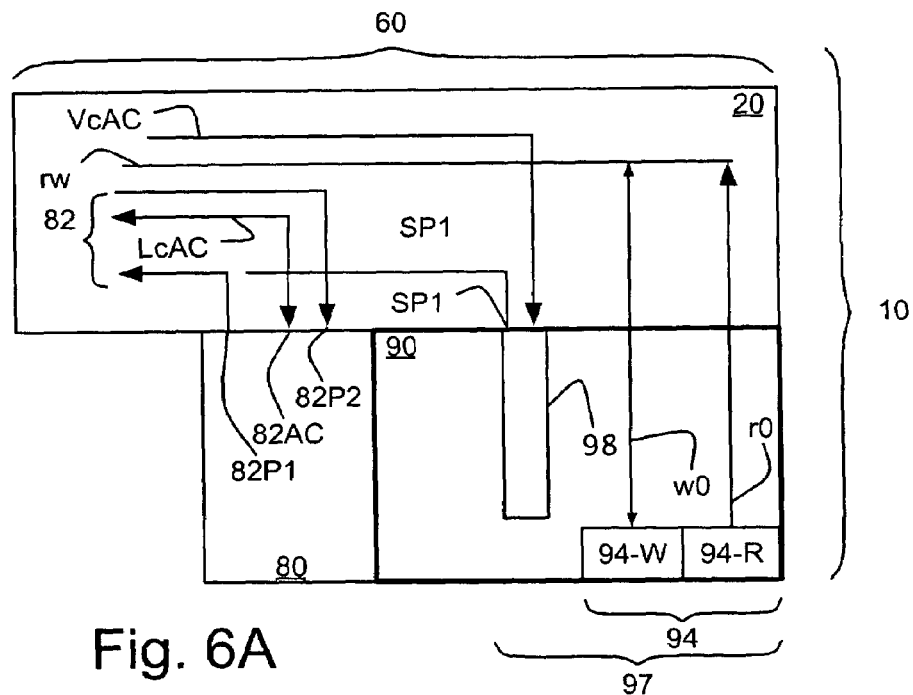
FIGS. 6A and 6B show some aspects of the slider, the flexure finger and the head gimbal assembly.

The slider 90 includes a vertical micro-actuator 98, coupled to a deformation region 97 including a read-write head 94 and stimulated by a vertical control signal VcAC providing a potential difference with a first slider power terminal SP1, and in some embodiments, heating the deformation region to alter the vertical position Vp of the read-write head over the rotating disk surface 120-1 in a hard disk drive 10 as shown in FIG. 6A.

The slider 90 is used to access the data 122 on the rotating disk surface 120-1 in a hard disk drive 10. The data is typically organized in units known as a track 122, which are usually arranged in concentric circles on the rotating disk surface centered about a spindle shaft 40 and alternatively may be organized as joined spiral tracks. Operating the slider to read access the data on the rotating disk surface includes the read head 94-R driving the read differential signal pair r0 to read access the data on the rotating disk surface. The read-write head 94 is formed perpendicular to the air bearing surface 92 to the amplifier 96.

Figure 7A:
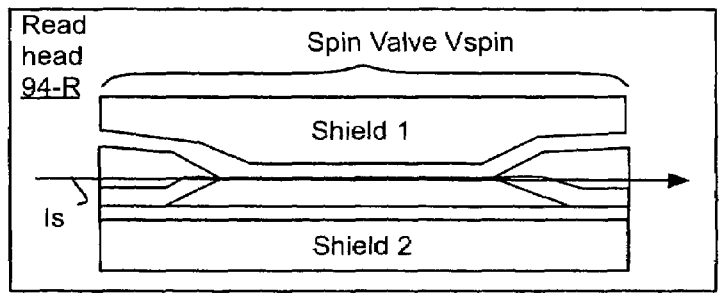
FIG. 7A shows an example of the read head of FIG. 6A employing a spin valve.

The read head 94-R may use a spin valve to drive the read differential signal pair as shown in FIG. 7A. As used herein, the spin valve employs a magneto-resistive effect to create an induced sensing current Is between the first shield Shield1 and the second shield Shield2. Spin valves have been in use the since the mid 1990's.

Figure 7B:
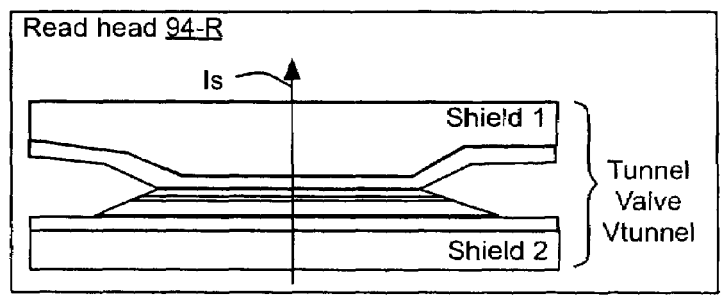
FIG. 7B shows an example of the read head of FIG. 6A employing a tunnel valve.
Figure 7C:
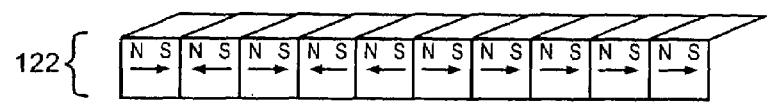
FIG. 7C shows a typical polarization of bits in the track which is parallel the rotating disk surface.
Figure 7D:
FIG. 7D shows a typical polarization of bits in the track which is perpendicular to the rotating disk surface.

The read head 94-R may use a tunnel valve to drive the read differential signal pair as shown in FIG. 7B. As used herein, a tunnel valve uses a tunneling effect to modulate the sensing current Is perpendicular to the first shield Shield1 and the second shield Shield2. Both longitudinally recorded signals as shown in FIG. 7C and perpendicularly recorded signals shown in FIG. 7D can be read by either reader type. Perpendicular versus longitudinal recording relates to the technology of the writer/media pair, not just the reader.

The tunnel valve is used as follows. A pinned magnetic layer is separated from a free ferromagnetic layer by an insulator, and is coupled to a pinning antiferromagnetic layer. The magneto-resistance of the tunnel valve is caused by a change in the tunneling probability, which depends upon the relative magnetic orientation of the two ferromagnetic layers. The sensing current Is, is the result of this tunneling probability. The response of the free ferromagnetic layer to the magnetic field of the bit of the track 122 of the rotating disk surface 120-1, results in a change of electrical resistance through the tunnel valve.

Figure 6B:
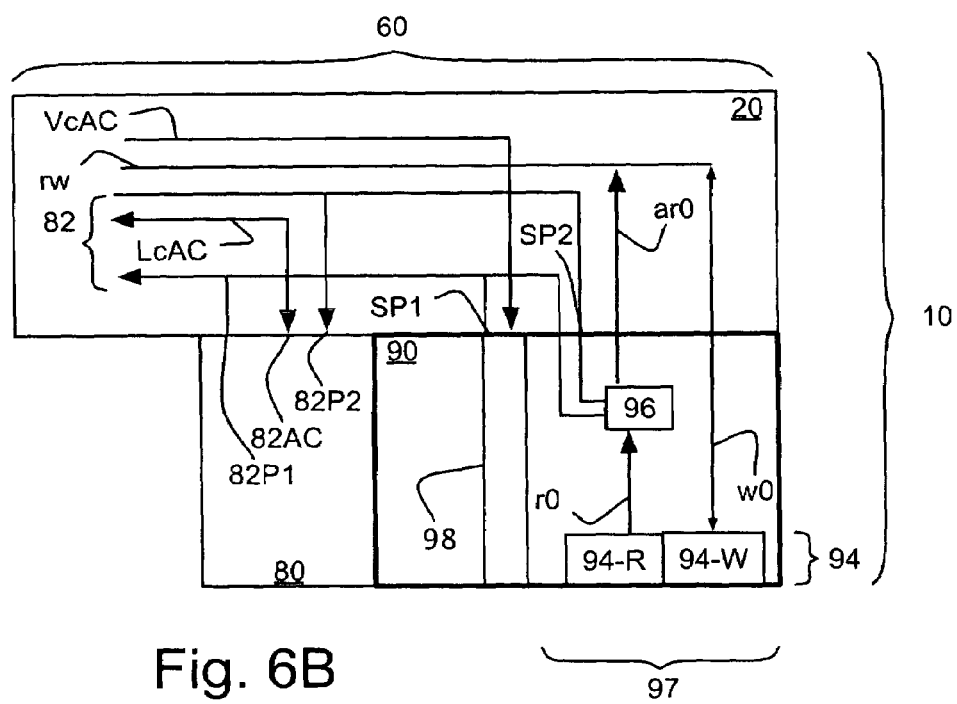

The slider 90 may further include the read-write head 94 providing the read-differential signal pair r0 to the amplifier 96 to generate the amplified read signal ar0, as shown in FIG. 6B. The read-write head preferably includes a read head 94-R driving the read differential signal pair r0 and a write head 94-W receiving a write differential signal pair w0. The slider reports the amplified read signal as a result of read access of the data on the rotating disk surface. In some embodiments of the slider, the amplifier is preferably opposite the air bearing surface 92. The amplified read signal ar0 may be implemented as an amplified read signal pair ar0+− or as a single ended read signal. The vertical micro-actuator 98 included in the slider operates by deforming the deformation region 97 as well as any other materials directly coupled to it, making it preferable for the amplifier to be separated from the vertical micro-actuator and the deformation region, as shown in FIGS. 2B and 6B. These embodiments of the slider preferably include a first slider power terminal SP1 and a second slider power terminal SP2 collectively used to power the amplifier in generating the amplified read signal ar0.

The flexure finger 20 for the slider 90 of FIGS. 1, 5, 6A, and 6B, preferably contains a micro-actuator assembly 80 for mechanically coupling to the slider to aid in positioning the slider to access the data 122 on 120-1 rotating disk surface of the disk 12. The micro-actuator assembly may aid in laterally positioning LP the slider to the rotating disk surface as shown in FIG. 1B and/or aid in vertically positioning VP the slider as shown in FIGS. 1 and 5. The flexure finger 20 may further provide the vertical control signal VcAC and preferably the first lateral control signal 82P1 as the first slider power terminal SP1 to the vertical micro-actuator.

The flexure finger 20 preferably includes the lateral control signal 82 and trace paths between the slider for the write differential signal pair w0. The lateral control signal preferably includes the first lateral control signal 82P1 and the second lateral control signal 82P2, as well as the AC lateral control signal 82AC. When the slider does not contain an amplifier 96, as shown in FIGS. 1, 5, and 6A, the flexure finger further preferably provides trace paths for the read differential signal pair r0.

The micro-actuator assembly 80 may employ a piezoelectric effect and/or an electrostatic effect and/or a thermal-mechanical effect to aid in positioning the slider 90. The micro-actuator assembly may further couple through the flexure finger to a load beam 74 to the head gimbal assembly and consequently to the head stack assembly 50.

The flexure finger 20 may further provide a read trace path rtp for the amplified read signal ar0, as shown in FIG. 6B. The slider 90 may further include a first slider power terminal SP1 and a second slider power terminal SP2, both electrically coupled to the amplifier 96 to collectively provide power to generate the amplified read signal ar0. The flexure finger may further include a first power path SP1P electrically coupled to the first slider power terminal SP1 and/or a second power path SP2P electrically coupled to the second slider power terminal SP2, which are collectively used to provide electrical power to generate the amplified read signal.

The head gimbal assembly 60 includes the flexure finger 20 coupled with the slider 90 and a micro-actuator assembly 80 mechanically coupling to the slider to aid in positioning the slider to access the data 122 on the rotating disk surface 120-1. The micro-actuator assembly may further include a first micro-actuator power terminal 82P1 and a second micro-actuator power terminal 82P2. The head gimbal assembly may further include the first micro-actuator power terminal electrically coupled to the first power path SP1P and/or the second micro-actuator power terminal electrically coupled to the second power path SP2P. Operating the head gimbal assembly may further preferably include operating the micro-actuator assembly to aid in positioning the slider to read access the data on the rotating disk surface, which includes providing electrical power to the micro-actuator assembly.

The head gimbal assembly 60 may further provide the vertical control signal VcAC to the heating element of the vertical micro-actuator 98, as shown in FIGS. 1, 6A, and 6B. Operating the head gimbal assembly may further preferably include driving the vertical control signal. The first micro-actuator power terminal 82P1 may be tied to the first slider power terminal SP1, and both electrically coupled to the first power path SP1P.

The head gimbal assembly 60 may further include the amplifier 96 to generate the amplified read signal ar0 using the first slider power terminal SP1 and the second slider power terminal SP2. The flexure finger 20 may further contain a read trace path rtp electrically coupled to the amplified read signal ar0, as shown in FIG. 6B. The head gimbal assembly operates as follows when read accessing the data 122, preferably organized as the track 122, on the rotating disk surface 120-1. The slider 90 reports the amplified read signal ar0 as the result of the read access.

The flexure finger 20 may be coupled to the load beam 74, which may further include the first power path SP1P electrically coupled to a metallic portion of the load beam. In certain embodiments, the metallic portion may be essentially all of the load beam.

In further detail, the head gimbal assembly 60 includes a base plate 72 coupled through a hinge 70 to a load beam 74. Often the flexure finger 20 is coupled to the load beam and the micro-actuator assembly 80 and slider 90 are coupled through the flexure finger to the head gimbal assembly. The load beam may preferably electrically couple to the slider to the first slider power terminal SP1, and may further preferably electrically couple to the micro-actuator assembly to form the first power path SP1P.

The head stack assembly 50 contains at least one head gimbal assembly 60 coupled to a head stack 54, as shown in FIGS. 1 and 5.

The head stack assembly 50 may include more than one head gimbal assembly 60 coupled to the head stack 54. By way of example, FIG. 5 shows the head stack assembly coupled with a second head gimbal assembly 60-2, a third head gimbal assembly 60-3 and a fourth head gimbal assembly 60-4. Further, the head stack is shown in FIG. 1 including the actuator arm 52 coupling to the head gimbal assembly. In FIG. 5, the head stack further includes a second actuator arm 52-2 and a third actuator arm 52-3, with the second actuator arm coupled to the second head gimbal assembly 60-2 and a third head gimbal assembly 60-3, and the third actuator arm coupled to the fourth head gimbal assembly 60-4. The second head gimbal assembly includes the second slider 90-2, which contains the second read-write head 94-2. The third head gimbal assembly includes the third slider 90-3, which contains the third read-write head 94-3. And the fourth head gimbal assembly includes a fourth slider 90-4, which contains the fourth read-write head 94-4.

In certain embodiments where the slider 90 includes the amplifier 96, the slider reports the amplified read signal ar0 as the result of the read access to the track 122 on the rotating disk surface 120-1. The flexure finger provides the read trace path rtp for the amplified read signal, as shown in FIG. 2B. The head stack assembly 50 may include a main flex circuit 200 coupled with the flexure finger 20, which may further include a preamplifier 24 electrically coupled to the read trace path rtp in the read-write signal bundle rw to create the read signal 25-R based upon the amplified read signal as a result of the read access.

The preceding embodiments provide examples of the invention and are not meant to constrain the scope of the following claims.

What is claimed is:

1. A first method of calibrating an assembled hard disk drive, comprising the steps:
   reading a short transition-pair waveform and a long transition-pair waveform from their location on a rotating disk surface in said assembled hard disk drive;
   constructing a simulated long transition pair waveform by shift-adding said short transition pair waveform;
   aligning the peaks of simulated long transition-pair waveform with said long transition-pair waveform;
   creating a transfer table from an aligned value of said simulated long transition-pair waveform versus the long transition-pair value.

2. The first method of claim 1, wherein the step reading, further comprises at least one member of the group consisting of:
   repeatedly reading a short transition-pair location and averaging to create said short transition-pair waveform; and
   repeatedly reading a long transition-pair location and averaging to create said long transition-pair waveform.

3. The first method of claim 1, wherein the step constructing, further comprises the step:
   Creating a simulated long transition-pair waveform by adding time-offset instances of said short transition-pair waveform.

4. The first method of claim 1, further comprising the steps:
   writing a short transition-pair pattern on said rotating disk surface to create a version of said short transition-pair waveform;
   writing a long transition-pair pattern on said rotating disk surface to create a version of said long transition-pair waveform.

5. The first method of claim 4, wherein said short transition-pair pattern and said long transition-pair pattern are both encoded by a Non-Recurring Zero coding scheme.

6. The first method of claim 4, wherein said short transition-pair pattern and said long transition-pair pattern are both encoded by a Non-Recurring Zero Inverse coding scheme.

7. The transfer table as a product of the process of claim 1.

8. The transfer table of claim 7, further comprising at least one non-linear correction factor to implement a non-linear compensation function correcting said long transition-pair waveform nonlinear distortion.

9. The transfer table of claim 7, further comprising:
   a list of at least two data pairs, each including an input data and an output data;
   wherein for each of said data pairs, said input data is a value from said simulated long transition-pair waveform, and said output data is the corresponding value of the long transition-pair waveform.

10. A second method of correcting waveform nonlinear distortion in the playback of said track written on said rotating disk surface based on said transfer table of claim 9, further comprising the step:
    using said transfer table on the read data of said track to create an adjusted read data for said track, further comprising, for at least one playback sample included in said read data, further comprising the steps:
    finding a correspondent of said data pair including said output data corresponding to said playback sample; and
    using said input data of said correspondent of said data pair to create an adjusted playback sample included in said adjusted read data.

11. The second method of claim 10, wherein the step using said transfer table on the read data of said track to create an adjusted read data for said track, further comprising, for each of said playback sample included in said read data, the steps:

finding said correspondent of said data pair including said output data corresponding to said playback sample; and using said input data of said correspondent of said data pair to create said adjusted playback sample included said adjusted read data.

12. The adjusted playback sample as a product of the process of claim 11.

13. The second method of claim 10, wherein said read data includes said playback samples related to at least one sector included in said track.

14. The second method of claim 13, wherein said read data include said playback samples related to each of said sectors included in said track.

15. An embedded circuit for implementing the second method of claim 10, comprising:
   a processor using said transfer table on the read data of said track to create said adjusted read data for said track, for at least one of said playback sample included in said read data, further comprising:
   said processor finding said correspondent of said data pair including said output data corresponding to said playback sample; and
   said processor using said input data of said correspondent of said data pair to create said adjusted playback sample included said adjusted read data;
   wherein said processor includes at least one instance of at least one controller; wherein each of said controllers include at least one input, maintain and update at least one state, and generate at least one output based upon at least one member of the group consisting of: said at least one input and said at least one state.

16. The embedded circuit of claim 15, further comprising: said processor receives said playback sample from a channel interface to create said output data as an address to said transfer table to present said input data as said adjusted playback sample.

17. The embedded circuit of claim 16, wherein an embedded computer is used to implement said processor.

18. A method of manufacturing said embedded circuit of claim 15, comprising the step:
   providing said processor and said transfer table to create said embedded circuit.

19. The embedded circuit as a product of the process of claim 18.

20. A hard disk drive implementing the second method of claim 10, comprising: said transfer table and said read data; and
   wherein for at least one of said tracks included in at least one of said rotating disk surfaces, said transfer table is used on said read data of said track to create said adjusted read data for said track.

21. The hard disk drive of claim 20, wherein for each of said track used for user data on said rotating disk surface, said transfer table is used on said read data of said track to create said adjusted read data for said track.

22. The hard disk drive of claim 20, wherein said read data resides in the same memory locations as said adjusted read data.

23. The transfer table of claim 7, comprising said list includes N of said data pairs, wherein N is the number of distinct values of the playback sample received from a channel interface.

24. The transfer table of claim 23, wherein said list is organized as an array using each of said output data as the address of said input data.

25. The first method of claim 1, further comprising at least one member of the group consisting of the steps:

writing said transfer table to a non-volatile memory component of said embedded circuit to create a saved version of said transfer table; and writing said transfer table to a dedicated area of said rotating disk surface to create said saved version of said transfer table.

26. The saved version of said transfer table as a product of the process of claim 25.

27. The first method of claim 1, wherein said location for said short transition-pair waveform includes at least one member of the group consisting of:
   at least one of said tracks on said rotating disk surface;
   at least one sector in said track; and
   a data payload included in said sector; and
   wherein said location for said long transition-pair waveform includes at least one member of the group consisting of:
   said at least one tracks on said rotating disk surface;
   said at least one sector in said track;
   said data payload included in said sector;
   at least one distinct track on said rotating disk surface;
   at least one distinct sector in said track; and
   said data payload included in said distinct sector.

28. The first method of claim 1, wherein said hard disk drive uses at least two of said rotating disk surfaces for data access.

29. The first method of claim 28, further comprising, for each of said rotating disk surfaces and head combination, the steps:
   reading said short transition-pair waveform and said long transition-pair waveform from their location on said rotating disk surface in said assembled hard disk drive;
   reconstructing the simulated long transition pair waveform by shift-adding short transition pair waveform;
   aligning the peaks of simulated long transition-pair\ waveform with said long transition-pair waveform;
   creating said transfer table from an aligned value of said simulated long transition-pair waveform versus the long transition-pair value.

30. A method of manufacturing based upon said assembled hard disk drive using the first method of claim 1, comprising the steps:
   writing to a disk a short transition-pair pattern to create a version of said short transition-pair waveform;
   writing to a disk a long transition-pair pattern to create a version of said long transition-pair waveform;
   reading said short transition-pair waveform and said long transition-pair waveform from their location on said rotating disk surface in said assembled hard disk drive;
   reconstructing the simulated long transition pair waveform by shift-adding short transition pair waveform;
   aligning the peaks of said simulated long transition-pair waveform with said long transition-pair waveform;
   creating said transfer table from said aligned value of said simulated long transition-pair waveform versus the long transition-pair value; and
   using said transfer table to create a hard disk drive.

31. The hard disk drive as a product of the process of claim 30.

32. The first method of claim 1, wherein the step reading, further comprises the step:
   reading said short transition-pair waveform and said long transition-pair waveform from their location on said rotating disk surface in said assembled hard disk drive with an external oscilloscope.

33. The assembled hard disk drive implementing the first method of claim 1, comprising:

an embedded circuit, further comprising:
a processor reading said short transition-pair waveform and said long transition-pair waveform from their location on said rotating disk surface in said assembled hard disk drive;
said processor constructing said simulated long transition pair waveform by shift-adding said short transition pair waveform;
said processor aligning said peaks of simulated long transition-pair waveform with said long transition-pair waveform; and
said processor creating said transfer table from said aligned value of said simulated long transition-pair waveform versus said long transition-pair value.

34. An embedded circuit for directing a hard disk drive, comprising:
a processor using a transfer table on the read data of a track on a rotating disk surface to create an adjusted read data for said track;
wherein when said read data of said track is written with a simulated long-pair waveform based upon time offset adding N instances of a short transition-pair waveform approximates a long transition-pair waveform, then said adjusted read data approximates said simulated long-pair transition waveform;
wherein said short transition-pair waveform of a bit cell time length T is a discrete form of an approximate anti-symmetric real-valued function of compact support having a support interval of length twice of said bit cell time length T.

35. The processor of claim 34,
wherein said processor using said transfer table on said read data of said track to create said adjusted read data for said track, for at least one of said playback sample included in said read data, further comprising:
said processor finding said correspondent of said data pair including said output data corresponding to said playback sample; and
said processor using said input data of said correspondent of said data pair to create said adjusted playback sample included said adjusted read data;
wherein said processor includes at least one instance of at least one controller; wherein each of said controllers include at least one input, maintain and update at least one state, and generate at least one output based upon at least one member of the group consisting of: said at least one input and said at least one state.

36. The processor of claim 34, comprising: an embedded computer accessibly coupled via a buss to a memory and directed by an second program system, further comprising the program step residing in said memory:
using said transfer table on said read data of said track to create said adjusted read data for said track, for at least one of said playback sample included in said read data, further comprising the program steps:
finding said correspondent of said data pair including said output data corresponding to said playback sample; and
using said input data of said correspondent of said data pair to create said adjusted playback sample included said adjusted read data.

37. A method of manufacturing said processor of claim 36, comprising the step:
writing said second program system into a non-volatile memory component of said memory to create said processor.

38. The processor as a product of the process of claim 37.

39. The hard disk drive, comprising: said embedded circuit of claim 34 coupling to a head stack to provide said read data of said track on said rotating disk surface.

40. The hard disk drive of claim 39, wherein said read data includes playback samples related to at least one sector included in said track.

41. The hard disk drive of claim 39, wherein said read data includes said playback samples related to each of said sectors included in said track.

42. A method of manufacturing said hard disk drive of claim 39, comprising the steps:
calibrating an assembled hard disk drive to generate said transfer table;
using said transfer table in said assembled hard disk drive to create said hard disk drive.

43. The hard disk drive as a product of the process of claim 42.

44. The method of claim 42, wherein the step calibrating said assembled hard disk drive, further comprises the steps:
writing to a disk a short transition-pair pattern to create a version of said short transition-pair waveform;
writing to a disk a long transition-pair pattern to create a version of said long transition-pair waveform;
reading said short transition-pair waveform and said long transition-pair waveform from their location on said rotating disk surface in said assembled hard disk drive;
reconstructing said simulated long transition pair waveform by shift-adding short transition pair waveform;
aligning the peaks of said simulated long transition-pair waveform with said long transition-pair waveform; and
creating said transfer table from said aligned value of said simulated long transition-pair waveform versus the long transition-pair value.

* * * * *